US010425775B2

(12) United States Patent
Yang et al.

(10) Patent No.: US 10,425,775 B2
(45) Date of Patent: Sep. 24, 2019

(54) MULTI-GROUP CALL SETUP METHOD AND DEVICE

(71) Applicant: Huawei Technologies Co., Ltd., Shenzhen (CN)

(72) Inventors: Yanmei Yang, Beijing (CN); Yizhuang Wu, Beijing (CN); Cuili Ge, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 39 days.

(21) Appl. No.: 15/722,642

(22) Filed: Oct. 2, 2017

(65) Prior Publication Data
US 2018/0027392 A1 Jan. 25, 2018

Related U.S. Application Data

(63) Continuation of application No. PCT/CN2015/076144, filed on Apr. 9, 2015.

(51) Int. Cl.
| H04W 4/08 | (2009.01) |
| H04W 4/10 | (2009.01) |
| H04W 84/08 | (2009.01) |
| H04L 12/18 | (2006.01) |
| H04W 76/45 | (2018.01) |
| H04W 4/90 | (2018.01) |

(52) U.S. Cl.
CPC .............. H04W 4/08 (2013.01); H04L 12/18 (2013.01); H04W 4/10 (2013.01); H04W 76/45 (2018.02); H04W 84/08 (2013.01); H04W 4/90 (2018.02)

(58) Field of Classification Search
CPC ......... H04W 4/10; H04W 76/45; H04W 4/08; H04W 84/08
USPC ....................... 455/518, 517, 519, 520, 67.11
See application file for complete search history.

(56) References Cited

U.S. PATENT DOCUMENTS

6,882,856 B1 * 4/2005 Alterman ................ H04W 4/08
370/312
7,933,621 B1 4/2011 Vu et al.
(Continued)

FOREIGN PATENT DOCUMENTS

CN 1889722 A 1/2007
CN 101044774 A 9/2007
(Continued)

OTHER PUBLICATIONS

"3rd Generation Partnership Project; Technical Specification Group Services and System Aspects; Mission Critical Push To Talk (MCPTT) over LTE; Stage 1(Release 13)," 3GPP TS 22.179 V13.1.0, Mar. 2015, 76 pages.
(Continued)

*Primary Examiner* — John J Lee
(74) *Attorney, Agent, or Firm* — Slater Matsil, LLP

(57) ABSTRACT

A multi-group call setup method and device are disclosed. The method includes determining, by a first MCPTT server, to set up a multi-group call involving N MCPTT groups, where N is an integer greater than or equal to 2, and sending, by the first MCPTT server, a call message to first UE, where the call message is used to add the first UE to the multi-group call, where a first MCPTT user is an associated user of the first UE, and where the first MCPTT user is an MCPTT user in the N MCPTT groups.

8 Claims, 6 Drawing Sheets

(56) References Cited

U.S. PATENT DOCUMENTS

| | | | |
|---|---|---|---|
| 9,787,733 B2 | 10/2017 | Poikselka et al. | |
| 2006/0053225 A1* | 3/2006 | Poikselka | H04L 12/1818 709/227 |
| 2011/0151917 A1* | 6/2011 | Mao | H04W 4/10 455/519 |
| 2018/0027393 A1 | 1/2018 | Yang et al. | |

FOREIGN PATENT DOCUMENTS

| | | |
|---|---|---|
| CN | 101459880 A | 6/2009 |
| CN | 103167421 A | 6/2013 |
| JP | 2008109202 A | 5/2008 |
| JP | 2018512000 A | 4/2018 |
| RU | 2504926 C1 | 1/2014 |

OTHER PUBLICATIONS

"Group Call Models for MCPTT on Network," Agenda Item: 6.4, Source: Samsung, Contact: Basavaraj Pattan (basavarajjpatsamsungdotcom), 3GPP TSG-SA WG6 Meeting #3, S6-150188, Apr. 13-17, 2015, 4 pages.

\* cited by examiner

MULTI-GROUP CALL SETUP METHOD AND DEVICE

CROSS-REFERENCE TO RELATED APPLICATIONS

This application is a continuation of International Application No. PCT/CN2015/076144, filed on Apr. 9, 2015, the disclosure of which is hereby incorporated by reference in its entirety.

TECHNICAL FIELD

Embodiments of the present invention relate to the field of communications technologies, and in particular, to a multi-group call setup method and device.

BACKGROUND

In practical application, there is a requirement that an authorized mission critical push to talk (MCPTT for short) user may need to initiate a group call involving multiple MCPTT groups. For example, in some emergencies, fire brigades and police forces cooperate with each other. Because an on-site commander may need to coordinate actions of multiple MCPTT groups to deliver a same instruction and task, a call involving the multiple MCPTT groups is initiated. In the prior art, such a function of a multi-group call cannot be supported yet.

SUMMARY

Embodiments of the present invention provide a multi-group call setup method and device, to perform a multi-group call among multiple MCPTT groups.

According to a first aspect, an embodiment of the present invention provides a multi-group call setup method, including determining, by a first MCPTT server, to set up a multi-group call involving N MCPTT groups, where N is an integer greater than or equal to 2, and sending, by the first MCPTT server, a call message to first user equipment (UE for short), where the call message is used to add the first UE to the multi-group call, where a first MCPTT user is an associated user of the first UE, and the first MCPTT user is any MCPTT user in the N MCPTT groups.

With reference to the second aspect, in a first possible implementation manner of the first aspect, before the determining, by a first MCPTT server, to set up a multi-group call involving N MCPTT groups, the method further includes receiving, by the first MCPTT server, a multi-group call setup message sent by second UE, where the multi-group call setup message is used by a second MCPTT user to request the first MCPTT server to set up the multi-group call involving the N MCPTT groups, the second MCPTT user is an associated user of the second UE, and an MCPTT group to which the second MCPTT user belongs is at least one of the N MCPTT groups, and the determining, by a first MCPTT server, to set up a multi-group call involving N MCPTT groups includes determining, by the first MCPTT server according to the multi-group call setup message, to set up the multi-group call, where the first MCPTT user is any MCPTT user in the N MCPTT groups except the second MCPTT user.

With reference to the first possible implementation manner of the first aspect, in a second possible implementation manner of the first aspect, the multi-group call setup message includes an identifier of a temporary group that includes the N MCPTT groups, and the first MCPTT server is an MCPTT server of the temporary group.

With reference to the second possible implementation manner of the first aspect, in a third possible implementation manner of the first aspect, the receiving, by the first MCPTT server, a multi-group call setup message sent by second UE includes receiving, by the first MCPTT server, the multi-group call setup message that is sent by the second UE and that is forwarded by an MCPTT server of the second MCPTT user.

With reference to the second possible implementation manner of the first aspect or the third possible implementation manner of the first aspect, in a fourth possible implementation manner of the first aspect, before the sending, by the first MCPTT server, a call message to first UE, the method further includes obtaining, by the first MCPTT server, information about the temporary group according to the identifier of the temporary group, where the information about the temporary group includes the identifier of the temporary group and identifiers of the N MCPTT groups.

With reference to the fourth possible implementation manner of the first aspect, in a fifth possible implementation manner of the first aspect, the information about the temporary group further includes information about an MCPTT user in at least one of the N MCPTT groups.

With reference to the first possible implementation manner of the first aspect, in a sixth possible implementation manner of the first aspect, the multi-group call setup message includes identifiers of the N MCPTT groups, and the first MCPTT server is an MCPTT server of the second MCPTT user.

With reference to the sixth possible implementation manner of the first aspect, in a seventh possible implementation manner of the first aspect, before the sending, by the first MCPTT server, a call message to first UE, the method further includes obtaining, by the first MCPTT server, information about an MCPTT user in at least one of the N MCPTT groups according to the identifiers of the N MCPTT groups.

With reference to any one of the first aspect, or the first to the seventh possible implementation manners of the first aspect, in an eighth possible implementation manner of the first aspect, the sending, by the first MCPTT server, a call message to first UE includes sending, by the first MCPTT server, a first paging message to the first UE, where the first paging message is used to page the first UE to join the multi-group call, so that the first UE joins the multi-group call according to the first paging message.

With reference to any one of the first aspect, or the first to the seventh possible implementation manners of the first aspect, in a ninth possible implementation manner of the first aspect, the sending, by the first MCPTT server, a call message to first UE includes sending, by the first MCPTT server, a second paging message to an MCPTT server of the first MCPTT user, where the second paging message is used to page the first UE to join the multi-group call, so that the MCPTT server of the first MCPTT user sends a third paging message to the first UE, and the first UE joins the multi-group call according to the third paging message.

With reference to any one of the first aspect, or the first to the seventh possible implementation manners of the first aspect, in a tenth possible implementation manner of the first aspect, the sending, by the first MCPTT server, a call message to first UE includes sending, by the first MCPTT server, a fourth paging message to an MCPTT server of an MCPTT group to which the first MCPTT user belongs, where the fourth paging message is used to page the first UE to join the multi-group call, so that the MCPTT server of the MCPTT group to which the first MCPTT user belongs sends a fifth paging message to the first UE or sends a fifth paging message to the first UE by using an MCPTT server of the first MCPTT user, and the first UE joins the multi-group call according to the fifth paging message, where the fifth paging message is used to page the first UE to join the multi-group call.

With reference to any one of the first aspect, or the first to the seventh possible implementation manners of the first aspect, in an eleventh possible implementation manner of the first aspect, the sending, by the first MCPTT server, a call message to first UE includes sending, by the first MCPTT server, a first notification message to the first UE, where the first notification message includes a session identifier of the multi-group call, and the first notification message is used to instruct the first UE to join the multi-group call according to the session identifier, so that the first UE joins the multi-group call according to the session identifier.

With reference to any one of the first aspect, or the first to the seventh possible implementation manners of the first aspect, in a twelfth possible implementation manner of the first aspect, the sending, by the first MCPTT server, a call message to first UE includes sending, by the first MCPTT server, a second notification message to an MCPTT server of the first MCPTT user, where the second notification message includes a session identifier of the multi-group call, and the second notification message is used to instruct the first UE to join the multi-group call according to the session identifier, so that the MCPTT server of the first MCPTT user sends a third notification message to the first UE, where the third notification message includes the session identifier, and the third notification message is used to instruct the first UE to join the multi-group call according to the session identifier, so that the first UE joins the multi-group call according to the session identifier.

With reference to any one of the first aspect, or the first to the seventh possible implementation manners of the first aspect, in a thirteenth possible implementation manner of the first aspect, the sending, by the first MCPTT server, a call message to first UE includes sending, by the first MCPTT server, a fourth notification message to an MCPTT server of an MCPTT group to which the first MCPTT user belongs, where the fourth notification message includes a session identifier of the multi-group call, and the fourth notification message is used to instruct the first UE to join the multi-group call according to the session identifier, so that the MCPTT server of the MCPTT group to which the first MCPTT user belongs sends a fifth notification message to the first UE or sends a fifth notification message to the first UE by using an MCPTT server of the first MCPTT user, and the first UE joins the multi-group call according to the session identifier.

According to a second aspect, an embodiment of the present invention provides a multi-group call setup method, including receiving, by first UE, a call message, where the call message is used to add the first UE to a multi-group call involving N MCPTT groups, N is an integer greater than or equal to 2, a first MCPTT user is an associated user of the first UE, and the first MCPTT user is any MCPTT user in the N MCPTT groups; and joining, by the first UE, the multi-group call according to the call message.

In a first possible implementation manner of the second aspect, the receiving, by first UE, a call message includes receiving, by the first UE, a notification message, where the notification message includes a session identifier of the multi-group call, and the notification message is used to instruct the first UE to join the multi-group call according to the session identifier; and the joining, by the first UE, the multi-group call according to the call message includes joining, by the first UE, the multi-group call according to the session identifier.

With reference to the second aspect or the first possible implementation manner of the second aspect, in a second possible implementation manner of the second aspect, the multi-group call involving the N MCPTT groups is initiated by a second MCPTT user, and the first MCPTT user is any MCPTT user in the N MCPTT groups except the second MCPTT user.

With reference to the second aspect, the first possible implementation manner of the second aspect, or the second possible implementation manner of the second aspect, in a third possible implementation manner of the second aspect, the receiving, by first UE, a call message includes receiving, by the first UE, the call message that is sent by an MCPTT server of an MCPTT group to which the first MCPTT user belongs, or receiving, by the first UE, the call message that is sent by an MCPTT server of the first MCPTT user, or receiving, by the first UE, the call message that is sent by an MCPTT server of a temporary group that includes the N MCPTT groups.

With reference to the second possible implementation manner of the second aspect, in a fourth possible implementation manner of the second aspect, the receiving, by first UE, a call message includes receiving, by the first UE, the call message that is sent by an MCPTT server of the second MCPTT user.

According to a third aspect, an embodiment of the present invention provides a multi-group call setup method, including generating, by second UE, a multi-group call setup message, where the multi-group call setup message is used by a second MCPTT user to request a first MCPTT server to set up a multi-group call involving N MCPTT groups, N is an integer greater than or equal to 2, the second MCPTT user is an associated user of the second UE, and an MCPTT group to which the second MCPTT user belongs is at least one of the N MCPTT groups; and sending, by the second UE, the multi-group call setup message to the first MCPTT server.

With reference to the third aspect, in a first possible implementation manner of the third aspect, the multi-group call setup message includes an identifier of a temporary group that includes the N MCPTT groups, and the first MCPTT server is an MCPTT server of the temporary group.

With reference to the first possible implementation manner of the third aspect, in a second possible implementation manner of the third aspect, the sending, by the second UE, the multi-group call setup message to the first MCPTT server includes sending, by the second UE, the multi-group call setup message to the first MCPTT server by using an MCPTT server of the second MCPTT user.

With reference to the first possible implementation manner of the third aspect or the second possible implementation manner of the third aspect, in a third possible implementation manner of the third aspect, before the sending, by the second UE, the multi-group call setup message to the first MCPTT server, the method further includes creating, by the second UE, the temporary group.

With reference to the third aspect, in a fourth possible implementation manner of the third aspect, the multi-group call setup message includes identifiers of the N MCPTT groups, and the first MCPTT server is an MCPTT server of the second MCPTT user.

According to a fourth aspect, an embodiment of the present invention provides an MCPTT server, serving as a first MCPTT server and including a processing unit, configured to determine to set up a multi-group call involving N MCPTT groups, where N is an integer greater than or equal to 2, and a transceiver unit, configured to send a call message to first user equipment UE, where the call message is used to add the first UE to the multi-group call, a first MCPTT user is an associated user of the first UE, and the first MCPTT user is any MCPTT user in the N MCPTT groups.

With reference to the fourth aspect, in a first possible implementation manner of the fourth aspect, before the processing unit determines to set up the multi-group call involving the N MCPTT groups, the transceiver unit is further configured to receive a multi-group call setup message sent by second UE, where the multi-group call setup message is used by a second MCPTT user to request the first MCPTT server to set up the multi-group call involving the N MCPTT groups, the second MCPTT user is an associated user of the second UE, and an MCPTT group to which the second MCPTT user belongs is at least one of the N MCPTT groups, and when determining to set up the multi-group call involving the N MCPTT groups, the processing unit is configured to determine, according to the multi-group call setup message, to set up the multi-group call, where the first MCPTT user is any MCPTT user in the N MCPTT groups except the second MCPTT user.

With reference to the first possible implementation manner of the fourth aspect, in a second possible implementation manner of the fourth aspect, the multi-group call setup message includes an identifier of a temporary group that includes the N MCPTT groups, and the first MCPTT server is an MCPTT server of the temporary group.

With reference to the second possible implementation manner of the fourth aspect, in a third possible implementation manner of the fourth aspect, when receiving the multi-group call setup message sent by the second UE, the transceiver unit is configured to receive the multi-group call setup message that is sent by the second UE and that is forwarded by an MCPTT server of the second MCPTT user.

With reference to the second possible implementation manner of the fourth aspect or the third possible implementation manner of the fourth aspect, in a fourth possible implementation manner of the fourth aspect, before the transceiver unit sends the call message to the first UE, the processing unit is further configured to obtain information about the temporary group according to the identifier of the temporary group, where the information about the temporary group includes the identifier of the temporary group and identifiers of the N MCPTT groups.

With reference to the fourth possible implementation manner of the fourth aspect, in a fifth possible implementation manner of the fourth aspect, the information about the temporary group further includes information about an MCPTT user in at least one of the N MCPTT groups.

With reference to the first possible implementation manner of the fourth aspect, in a sixth possible implementation manner of the fourth aspect, the multi-group call setup message includes identifiers of the N MCPTT groups, and the first MCPTT server is an MCPTT server of the second MCPTT user.

With reference to the sixth possible implementation manner of the fourth aspect, in a seventh possible implementation manner of the fourth aspect, before the transceiver unit sends the call message to the first UE, the processing unit is further configured to obtain information about an MCPTT user in at least one of the N MCPTT groups according to the identifiers of the N MCPTT groups.

With reference to any one of the fourth aspect, or the first to the seventh possible implementation manners of the fourth aspect, in an eighth possible implementation manner of the fourth aspect, when sending the call message to the first UE, the transceiver unit is configured to send a first paging message to the first UE, where the first paging message is used to page the first UE to join the multi-group call, so that the first UE joins the multi-group call according to the first paging message.

With reference to any one of the fourth aspect, or the first to the seventh possible implementation manners of the fourth aspect, in a ninth possible implementation manner of the fourth aspect, when sending the call message to the first UE, the transceiver unit is configured to send a second paging message to an MCPTT server of the first MCPTT user, where the second paging message is used to page the first UE to join the multi-group call, so that the MCPTT server of the first MCPTT user sends a third paging message to the first UE, and the first UE joins the multi-group call according to the third paging message.

With reference to any one of the fourth aspect, or the first to the seventh possible implementation manners of the fourth aspect, in a tenth possible implementation manner of the fourth aspect, when sending the call message to the first UE, the transceiver unit is configured to send a fourth paging message to an MCPTT server of an MCPTT group to which the first MCPTT user belongs, where the fourth paging message is used to page the first UE to join the multi-group call, so that the MCPTT server of the MCPTT group to which the first MCPTT user belongs sends a fifth paging message to the first UE or sends a fifth paging message to the first UE by using an MCPTT server of the first MCPTT user, and the first UE joins the multi-group call according to the fifth paging message, where the fifth paging message is used to page the first UE to join the multi-group call.

With reference to any one of the fourth aspect, or the first to the seventh possible implementation manners of the fourth aspect, in an eleventh possible implementation manner of the fourth aspect, when sending the call message to the first UE, the transceiver unit is configured to send a first notification message to the first UE, where the first notification message includes a session identifier of the multi-group call, and the first notification message is used to instruct the first UE to join the multi-group call according to the session identifier, so that the first UE joins the multi-group call according to the session identifier.

With reference to any one of the fourth aspect, or the first to the seventh possible implementation manners of the fourth aspect, in a twelfth possible implementation manner of the fourth aspect, when sending the call message to the first UE, the transceiver unit is configured to send a second notification message to an MCPTT server of the first MCPTT user, where the second notification message includes a session identifier of the multi-group call, and the second notification message is used to instruct the first UE to join the multi-group call according to the session identifier, so that the MCPTT server of the first MCPTT user sends a third notification message to the first UE, where the third notification message includes the session identifier, and the third notification message is used to instruct the first UE to join the multi-group call according to the session identifier, so that the first UE joins the multi-group call according to the session identifier.

With reference to any one of the fourth aspect, or the first to the seventh possible implementation manners of the fourth aspect, in a thirteenth possible implementation manner of the fourth aspect, when sending the call message to the first UE, the transceiver unit is configured to send a fourth notification message to an MCPTT server of an MCPTT group to which the first MCPTT user belongs, where the fourth notification message includes a session identifier of the multi-group call, and the fourth notification message is used to instruct the first UE to join the multi-group call according to the session identifier, so that the MCPTT server of the MCPTT group to which the first MCPTT user belongs sends a fifth notification message to the first UE or sends a fifth notification message to the first UE by using an MCPTT server of the first MCPTT user, and the first UE joins the multi-group call according to the session identifier.

According to a fifth aspect, an embodiment of the present invention provides UE, serving as first UE and including a transceiver unit, configured to receive a call message, where the call message is used to add the first UE to a multi-group call involving N MCPTT groups, N is an integer greater than or equal to 2, a first MCPTT user is an associated user of the first UE, and the first MCPTT user is any MCPTT user in the N MCPTT groups; and a processing unit, configured to join the multi-group call according to the call message.

With reference to the fifth aspect, in a first possible implementation manner of the fifth aspect, when receiving the call message, the transceiver unit is configured to receive a notification message, where the notification message includes a session identifier of the multi-group call, and the notification message is used to instruct the first UE to join the multi-group call according to the session identifier, and when joining the multi-group call according to the call message, the processing unit is configured to join the multi-group call according to the session identifier.

With reference to the fifth aspect or the first possible implementation manner of the fifth aspect, in a second possible implementation manner of the fifth aspect, the multi-group call involving the N MCPTT groups is initiated by a second MCPTT user, and the first MCPTT user is any MCPTT user in the N MCPTT groups except the second MCPTT user.

With reference to the fifth aspect, the first possible implementation manner of the fifth aspect, or the second possible implementation manner of the fifth aspect, in a third possible implementation manner of the fifth aspect, when receiving the call message, the transceiver unit is configured to receive the call message that is sent by an MCPTT server of an MCPTT group to which the first MCPTT user belongs, or receive the call message that is sent by an MCPTT server of the first MCPTT user, or receive the call message that is sent by an MCPTT server of a temporary group that includes the N MCPTT groups.

With reference to the second possible implementation manner of the fifth aspect, in a fourth possible implementation manner of the fifth aspect, when receiving the call message, the transceiver unit is configured to receive the call message that is sent by an MCPTT server of the second MCPTT user.

According to a sixth aspect, an embodiment of the present invention provides UE, serving as second UE and including a processing unit, configured to generate a multi-group call setup message, where the multi-group call setup message is used by a second MCPTT user to request a first MCPTT server to set up a multi-group call involving N MCPTT groups, N is an integer greater than or equal to 2, the second MCPTT user is an associated user of the second UE, and an MCPTT group to which the second MCPTT user belongs is at least one of the N MCPTT groups, and a transceiver unit, configured to send the multi-group call setup message to the first MCPTT server.

With reference to the sixth aspect, in a first possible implementation manner of the sixth aspect, the multi-group call setup message includes an identifier of a temporary group that includes the N MCPTT groups, and the first MCPTT server is an MCPTT server of the temporary group.

With reference to the first possible implementation manner of the sixth aspect, in a second possible implementation manner of the sixth aspect, when sending the multi-group call setup message to the first MCPTT server, the transceiver unit is configured to send the multi-group call setup message to the first MCPTT server by using an MCPTT server of the second MCPTT user.

With reference to the first possible implementation manner of the sixth aspect or the second possible implementation manner of the sixth aspect, in a third possible implementation manner of the sixth aspect, the processing unit is further configured to create the temporary group before the transceiver unit sends the multi-group call setup message to the first MCPTT server.

With reference to the sixth aspect, in a fourth possible implementation manner of the sixth aspect, the multi-group call setup message includes identifiers of the N MCPTT groups, and the first MCPTT server is an MCPTT server of the second MCPTT user.

According to a seventh aspect, an embodiment of the present invention provides an MCPTT server, serving as a first MCPTT server and including a processor, configured to determine to set up a multi-group call involving N MCPTT groups, where N is an integer greater than or equal to 2; and a transceiver, configured to send a call message to first user equipment UE, where the call message is used to add the first UE to the multi-group call, a first MCPTT user is an associated user of the first UE, and the first MCPTT user is any MCPTT user in the N MCPTT groups.

With reference to the seventh aspect, in a first possible implementation manner of the seventh aspect, before the processor determines to set up the multi-group call involving the N MCPTT groups, the transceiver is further configured to receive a multi-group call setup message sent by second UE, where the multi-group call setup message is used by a second MCPTT user to request the first MCPTT server to set up the multi-group call involving the N MCPTT groups, the second MCPTT user is an associated user of the second UE, and an MCPTT group to which the second MCPTT user belongs is at least one of the N MCPTT groups, and when determining to set up the multi-group call involving the N MCPTT groups, the processor is configured to determine, according to the multi-group call setup message, to set up the multi-group call, where the first MCPTT user is any MCPTT user in the N MCPTT groups except the second MCPTT user.

With reference to the first possible implementation manner of the seventh aspect, in a second possible implementation manner of the seventh aspect, the multi-group call setup message includes an identifier of a temporary group that includes the N MCPTT groups, and the first MCPTT server is an MCPTT server of the temporary group.

With reference to the second possible implementation manner of the seventh aspect, in a third possible implementation manner of the seventh aspect, when receiving the multi-group call setup message sent by the second UE, the transceiver is configured to receive the multi-group call setup message that is sent by the second UE and that is forwarded by an MCPTT server of the second MCPTT user.

With reference to the second possible implementation manner of the seventh aspect or the third possible implementation manner of the seventh aspect, in a fourth possible implementation manner of the seventh aspect, before the transceiver sends the call message to the first UE, the processor is further configured to obtain information about the temporary group according to the identifier of the temporary group, where the information about the temporary group includes the identifier of the temporary group and identifiers of the N MCPTT groups.

With reference to the fourth possible implementation manner of the seventh aspect, in a fifth possible implementation manner of the seventh aspect, the information about the temporary group further includes information about an MCPTT user in at least one of the N MCPTT groups.

With reference to the first possible implementation manner of the seventh aspect, in a sixth possible implementation manner of the seventh aspect, the multi-group call setup message includes identifiers of the N MCPTT groups, and the first MCPTT server is an MCPTT server of the second MCPTT user.

With reference to the sixth possible implementation manner of the seventh aspect, in a seventh possible implementation manner of the seventh aspect, before the transceiver sends the call message to the first UE, the processor is further configured to obtain information about an MCPTT user in at least one of the N MCPTT groups according to the identifiers of the N MCPTT groups.

With reference to any one of the seventh aspect, or the first to the seventh possible implementation manners of the seventh aspect, in an eighth possible implementation manner of the seventh aspect, when sending the call message to the first UE, the transceiver is configured to send a first paging message to the first UE, where the first paging message is used to page the first UE to join the multi-group call, so that the first UE joins the multi-group call according to the first paging message.

With reference to any one of the seventh aspect, or the first to the seventh possible implementation manners of the seventh aspect, in a ninth possible implementation manner of the seventh aspect, when sending the call message to the first UE, the transceiver is configured to send a second paging message to an MCPTT server of the first MCPTT user, where the second paging message is used to page the first UE to join the multi-group call, so that the MCPTT server of the first MCPTT user sends a third paging message to the first UE, and the first UE joins the multi-group call according to the third paging message.

With reference to any one of the seventh aspect, or the first to the seventh possible implementation manners of the seventh aspect, in a tenth possible implementation manner of the seventh aspect, when sending the call message to the first UE, the transceiver is configured to send a fourth paging message to an MCPTT server of an MCPTT group to which the first MCPTT user belongs, where the fourth paging message is used to page the first UE to join the multi-group call, so that the MCPTT server of the MCPTT group to which the first MCPTT user belongs sends a fifth paging message to the first UE or sends a fifth paging message to the first UE by using an MCPTT server of the first MCPTT user, and the first UE joins the multi-group call according to the fifth paging message, where the fifth paging message is used to page the first UE to join the multi-group call.

With reference to any one of the seventh aspect, or the first to the seventh possible implementation manners of the seventh aspect, in an eleventh possible implementation manner of the seventh aspect, when sending the call message to the first UE, the transceiver is configured to send a first notification message to the first UE, where the first notification message includes a session identifier of the multi-group call, and the first notification message is used to instruct the first UE to join the multi-group call according to the session identifier, so that the first UE joins the multi-group call according to the session identifier.

With reference to any one of the seventh aspect, or the first to the seventh possible implementation manners of the seventh aspect, in a twelfth possible implementation manner of the seventh aspect, when sending the call message to the first UE, the transceiver is configured to send a second notification message to an MCPTT server of the first MCPTT user, where the second notification message includes a session identifier of the multi-group call, and the second notification message is used to instruct the first UE to join the multi-group call according to the session identifier, so that the MCPTT server of the first MCPTT user sends a third notification message to the first UE, where the third notification message includes the session identifier, and the third notification message is used to instruct the first UE to join the multi-group call according to the session identifier, so that the first UE joins the multi-group call according to the session identifier.

With reference to any one of the seventh aspect, or the first to the seventh possible implementation manners of the seventh aspect, in a thirteenth possible implementation manner of the seventh aspect, when sending the call message to the first UE, the transceiver is configured to send a fourth notification message to an MCPTT server of an MCPTT group to which the first MCPTT user belongs, where the fourth notification message includes a session identifier of the multi-group call, and the fourth notification message is used to instruct the first UE to join the multi-group call according to the session identifier, so that the MCPTT server of the MCPTT group to which the first MCPTT user belongs sends a fifth notification message to the first UE or sends a fifth notification message to the first UE by using an MCPTT server of the first MCPTT user, and the first UE joins the multi-group call according to the session identifier.

According to an eighth aspect, an embodiment of the present invention provides UE, serving as first UE and including a transceiver, configured to receive a call message, where the call message is used to add the first UE to a multi-group call involving N MCPTT groups, N is an integer greater than or equal to 2, a first MCPTT user is an associated user of the first UE, and the first MCPTT user is any MCPTT user in the N MCPTT groups, and a processor, configured to join the multi-group call according to the call message.

With reference to the eighth aspect, in a first possible implementation manner of the eighth aspect, when receiving the call message, the transceiver is configured to receive a notification message, where the notification message includes a session identifier of the multi-group call, and the notification message is used to instruct the first UE to join the multi-group call according to the session identifier, and when joining the multi-group call according to the call message, the processor is configured to join the multi-group call according to the session identifier.

With reference to the eighth aspect or the first possible implementation manner of the eighth aspect, in a second possible implementation manner of the eighth aspect, the multi-group call involving the N MCPTT groups is initiated by a second MCPTT user, and the first MCPTT user is any MCPTT user in the N MCPTT groups except the second MCPTT user.

With reference to the eighth aspect, the first possible implementation manner of the eighth aspect, or the second possible implementation manner of the eighth aspect, in a third possible implementation manner of the eighth aspect, when receiving the call message, the transceiver is configured to receive the call message that is sent by an MCPTT server of an MCPTT group to which the first MCPTT user belongs, or receive the call message that is sent by an MCPTT server of the first MCPTT user, or receive the call message that is sent by an MCPTT server of a temporary group that includes the N MCPTT groups.

With reference to the second possible implementation manner of the eighth aspect, in a fourth possible implementation manner of the eighth aspect, when receiving the call message, the transceiver is configured to receive the call message that is sent by an MCPTT server of the second MCPTT user.

According to a ninth aspect, an embodiment of the present invention provides UE, serving as second UE and including a processor, configured to generate a multi-group call setup message, where the multi-group call setup message is used by a second MCPTT user to request a first MCPTT server to set up a multi-group call involving N MCPTT groups, N is an integer greater than or equal to 2, the second MCPTT user is an associated user of the second UE, and an MCPTT group to which the second MCPTT user belongs is at least one of the N MCPTT groups, and a transceiver, configured to send the multi-group call setup message to the first MCPTT server.

With reference to the ninth aspect, in a first possible implementation manner of the ninth aspect, the multi-group call setup message includes an identifier of a temporary group that includes the N MCPTT groups, and the first MCPTT server is an MCPTT server of the temporary group.

With reference to the first possible implementation manner of the ninth aspect, in a second possible implementation manner of the ninth aspect, when sending the multi-group call setup message to the first MCPTT server, the transceiver is configured to send the multi-group call setup message to the first MCPTT server by using an MCPTT server of the second MCPTT user.

With reference to the first possible implementation manner of the ninth aspect or the second possible implementation manner of the ninth aspect, in a third possible implementation manner of the ninth aspect, the processor is further configured to create the temporary group before the transceiver sends the multi-group call setup message to the first MCPTT server.

With reference to the ninth aspect, in a fourth possible implementation manner of the ninth aspect, the multi-group call setup message includes identifiers of the N MCPTT groups, and the first MCPTT server is an MCPTT server of the second MCPTT user.

According to the multi-group call setup method and device provided in the embodiments of the present invention, a first MCPTT server determines to set up a multi-group call involving N MCPTT groups, and sends a call message to first UE, so that the first UE joins the multi-group call according to the call message, where a first MCPTT user is an associated user of the first UE, and the first MCPTT user is any MCPTT user in the N MCPTT groups. In this way, the multi-group call can be performed among the N MCPTT groups.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
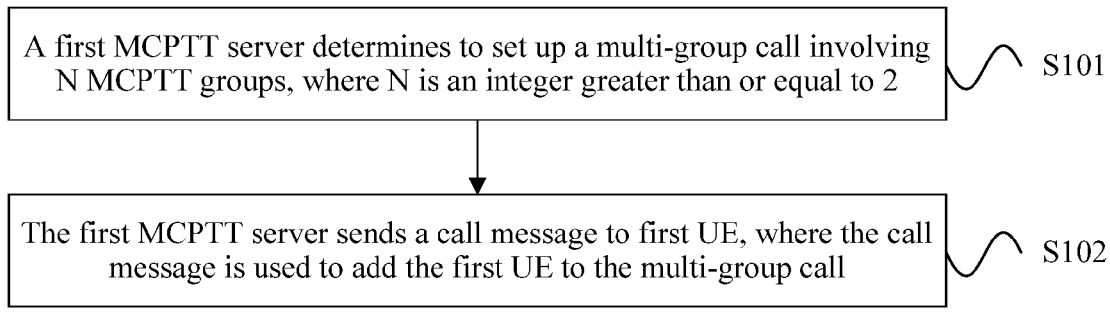
FIG. 1 is a flowchart of a first embodiment of a multi-group call setup method according to the some embodiments.

FIG. 1 is a flowchart of a first embodiment of a multi-group call setup method according to the present invention. As shown in FIG. 1, the method in this embodiment may include the following steps:

S101. A first MCPTT server determines to set up a multi-group call involving N MCPTT groups, where N is an integer greater than or equal to 2.

S102. The first MCPTT server sends a call message to first UE, where the call message is used to add the first UE to the multi-group call.

In this embodiment, the first MCPTT server may determine to set up the multi-group call involving the N MCPTT groups. The first MCPTT server may determine, according to a preset policy, to set up the multi-group call involving the N MCPTT groups; or the first MCPTT server determines, according to timing of a timer, to set up the multi-group call involving the N MCPTT groups; or the first MCPTT server may determine, in a manner described in a second method embodiment of the present invention, to set up the multi-group call involving the N MCPTT groups. This embodiment of the present invention imposes no limitation on how the first MCPTT server determines to set up the multi-group call involving the N MCPTT groups.

Then, the first MCPTT server sends the call message to the first UE, where the call message is used to add the first UE to the multi-group call. An associated user of the first UE is referred to as a first MCPTT user, and the associated user of the first UE refers to an MCPTT user who uses the first UE. The first MCPTT user may be any MCPTT user in the N MCPTT groups. In this manner, the first MCPTT server may add UE used by any MCPTT user in the N MCPTT groups to the multi-group call, and in this way, the multi-group call can be performed among the N MCPTT groups.

An optional implementation solution of S102 is similar to an implementation manner in which the first MCPTT server adds the first UE to the multi-group call in a fourth method embodiment of the present invention. For details, refer to the following descriptions. Details are not described herein.

According to the multi-group call setup method provided in this embodiment, a first MCPTT server determines to set up a multi-group call involving N MCPTT groups, and sends a call message to first UE, so that the first UE joins the multi-group call according to the call message, where a first MCPTT user is an associated user of the first UE, and the first MCPTT user is any MCPTT user in the N MCPTT groups. In this way, the multi-group call can be performed among the N MCPTT groups.

Figure 2:
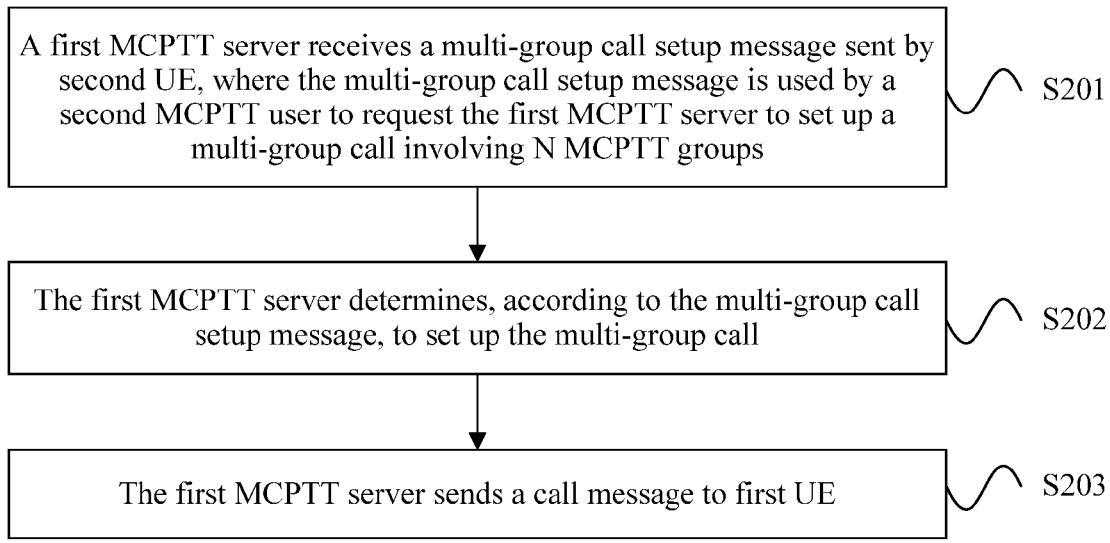
FIG. 2 is a flowchart of a second embodiment of a multi-group call setup method according to the some embodiments.

FIG. 2 is a flowchart of a second embodiment of a multi-group call setup method according to the present invention. As shown in FIG. 2, the method in this embodiment may include the following steps.

S201. A first MCPTT server receives a multi-group call setup message sent by second UE, where the multi-group call setup message is used by a second MCPTT user to request the first MCPTT server to set up a multi-group call involving N MCPTT groups.

S202. The first MCPTT server determines, according to the multi-group call setup message, to set up the multi-group call.

In this embodiment, the second MCPTT user is a user who initiates the multi-group call involving the N MCPTT groups. Because the second MCPTT user may belong to at least one MCPTT group, an MCPTT group to which the second MCPTT user belongs is at least one of the N MCPTT groups, that is, the N MCPTT groups include the second MCPTT user. The second MCPTT user is an associated user of the second UE, that is, the second UE is UE used by the second MCPTT user.

The first MCPTT server receives the multi-group call setup message sent by the second UE, where the multi-group call setup message is used by the second MCPTT user to request the first MCPTT server to set up the multi-group call involving the N MCPTT groups. The first MCPTT server determines, according to the multi-group call setup message, to set up the multi-group call. N is an integer greater than or equal to 2, and each MCPTT group includes at least one MCPTT user.

Optionally, the multi-group call setup message includes an identifier of a temporary group that includes the N MCPTT groups, and the multi-group call setup message is used by the second MCPTT user to request the first MCPTT server to set up, according to the identifier of the temporary group, the multi-group call involving the N MCPTT groups that form the temporary group corresponding to the identifier.

Optionally, the multi-group call setup message includes identifiers of the N MCPTT groups, and the multi-group call setup message is used by the second MCPTT user to request the first MCPTT server to set up, according to the identifiers of the N MCPTT groups, the multi-group call involving the N MCPTT groups that are corresponding to the N identifiers.

S203. The first MCPTT server sends a call message to first UE.

In this embodiment, a first MCPTT user is any MCPTT user in the N MCPTT groups except the second MCPTT user, and the first MCPTT user is an associated user of the first UE. The first MCPTT server that receives the multi-group call setup message may send the call message to the first UE, to add the first UE to the multi-group call. A process in which UE used by another MCPTT user joins the multi-group call is similar, and details are not described herein. In this way, the multi-group call can be performed among the N MCPTT groups.

For an optional implementation solution of S202, refer to related descriptions in a fourth method embodiment of the present invention.

According to the multi-group call setup method provided in this embodiment, a first MCPTT server receives a multi-group call setup message sent by second UE, where the multi-group call setup message is used by a second MCPTT user to request the first MCPTT server to set up a multi-group call involving N MCPTT groups; and then, the first MCPTT server sends a call message to first UE (where an associated user of the first UE is any MCPTT user in the N MCPTT groups except the first MCPTT user), so that the first UE joins the multi-group call. In this way, the multi-group call can be performed among the N MCPTT groups.

Figure 3:
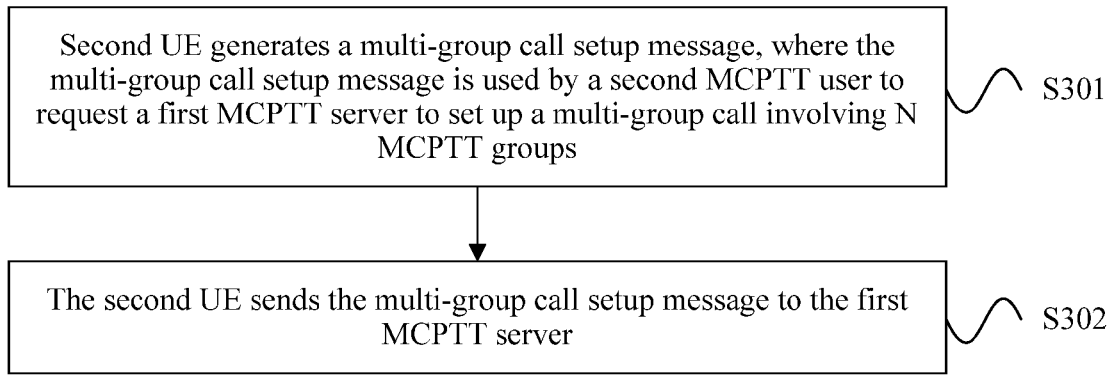
FIG. 3 is a flowchart of a third embodiment of a multi-group call setup method according to the some embodiments.

FIG. 3 is a flowchart of a third embodiment of a multi-group call setup method according to the present invention. As shown in FIG. 3, the method in this embodiment may include the following steps:

S301. Second UE generates a multi-group call setup message, where the multi-group call setup message is used by a second MCPTT user to request a first MCPTT server to set up a multi-group call involving N MCPTT groups.

In this embodiment, an associated user of the second UE is the second MCPTT user, that is, the second UE is UE used by the second MCPTT user. When the second MCPTT user initiates the multi-group call involving the N MCPTT groups, the second UE may determine, according to a user operation, that the second MCPTT user initiates the multi-group call involving the N MCPTT groups. The second UE may generate the multi-group call setup message, where the multi-group call setup message is used by the second MCPTT user to request the first MCPTT server to set up the multi-group call involving the N MCPTT groups, N is an integer greater than or equal to 2, and each MCPTT group includes at least one MCPTT user. Because the second MCPTT user may belong to at least one MCPTT group, an MCPTT group to which the second MCPTT user belongs is at least one of the N MCPTT groups.

S302. The second UE sends the multi-group call setup message to the first MCPTT server.

In this embodiment, the second UE sends the multi-group call setup message to the first MCPTT server. After receiving the multi-group call setup message, the first MCPTT server may send a call message to first UE according to the multi-group call setup message (where an associated user of the first UE is any MCPTT user in the N MCPTT groups except the second MCPTT user), so that the first UE joins the multi-group call involving the N MCPTT groups. In this way, the multi-group call can be performed among the N MCPTT groups.

Optionally, the multi-group call setup message includes an identifier of a temporary group that includes the N MCPTT groups, and the multi-group call setup message is used by the second MCPTT user to request the first MCPTT server to set up, according to the identifier of the temporary group, the multi-group call involving the N MCPTT groups that form the temporary group corresponding to the identifier.

Optionally, the first MCPTT server is a server of the temporary group.

Optionally, the second UE may send the multi-group call setup message to the server of the temporary group by using an MCPTT server of the second MCPTT user.

Optionally, the multi-group call setup message includes identifiers of the N MCPTT groups, and the multi-group call setup message is used by the second MCPTT user to request the first MCPTT server to set up, according to the identifiers of the N MCPTT groups, the multi-group call involving the N MCPTT groups that are corresponding to the N identifiers.

According to the multi-group call setup method provided in this embodiment of the present invention, second UE generates a multi-group call setup message, and sends the multi-group call setup message to a first MCPTT server, where the multi-group call setup message is used by a second MCPTT user to request the first MCPTT server to set up a multi-group call involving N MCPTT groups, so that the first MCPTT server can send a call message to first UE (where an associated user of the first UE is any MCPTT user in the N MCPTT groups except the second MCPTT user), and the first UE joins the multi-group call. In this way, the multi-group call can be performed among the N MCPTT groups.

Figure 4:
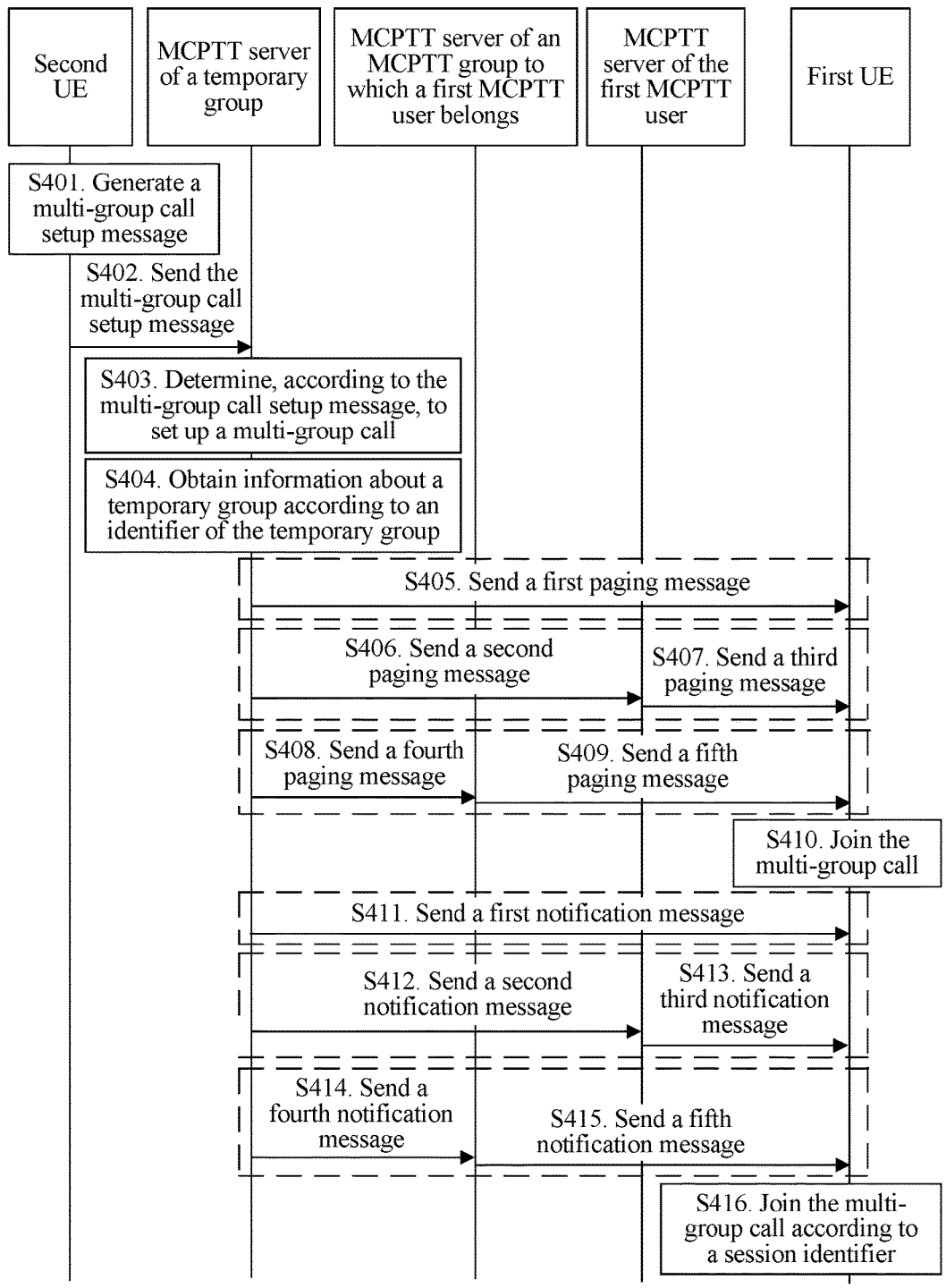
FIG. 4 is a flowchart of a fourth embodiment of a multi-group call setup method according to the some embodiments.

FIG. 4 is a flowchart of a fourth embodiment of a multi-group call setup method according to the present invention. As shown in FIG. 4, a multi-group call setup message in this embodiment includes an identifier of a temporary group that includes N MCPTT groups, and a first MCPTT server is an MCPTT server of the temporary group. The method in this embodiment may include the following steps:

S401. Second UE generates a multi-group call setup message.

In this embodiment, for a specific implementation process of S401, refer to related descriptions in the third method embodiment of the present invention. Details are not described herein.

S402. The second UE sends the multi-group call setup message to an MCPTT server of a temporary group.

In this embodiment, N MCPTT groups form a temporary group. For the temporary group, there is an MCPTT server of the temporary group. Therefore, the second UE sends the multi-group call setup message to the MCPTT server of the temporary group.

In an optional implementation solution, the second UE may directly send the multi-group call setup message to the MCPTT server of the temporary group without using another network element device.

In another optional implementation solution, the second UE may send the multi-group call setup message to the MCPTT server of the temporary group by using another network device (for example, an MCPTT server of a second MCPTT user), that is, the second UE sends the multi-group call setup message to the MCPTT server of the second MCPTT user, and the server of the second MCPTT user forwards the multi-group call setup message to the MCPTT server of the temporary group.

In this embodiment, the multi-group call setup message includes an identifier of the temporary group that includes the N MCPTT groups.

Optionally, before performing S402, the second UE may further obtain the identifier of the temporary group.

Optionally, before performing S402, the second UE may further create the temporary group.

S403. The MCPTT server of the temporary group determines, according to the multi-group call setup message, to set up a multi-group call.

S404. The MCPTT server of the temporary group obtains information about the temporary group according to an identifier of the temporary group.

In this embodiment, after receiving the multi-group call setup message, the MCPTT server of the temporary group may determine to set up a multi-group call involving the N MCPTT groups that form the temporary group, and then obtain the information about the temporary group according to the identifier of the temporary group in the multi-group call setup message.

The information about the temporary group includes the identifier of the temporary group and identifiers of the N MCPTT groups.

Optionally, the information about the temporary group may further include information about an MCPTT user in at least one of the N MCPTT groups.

Then, the MCPTT server of the temporary group may send a call message to first UE, to add the first UE to the multi-group call, where an associated user of the first UE is a first MCPTT user, and the first MCPTT user is any user in the N MCPTT groups except the second MCPTT user.

A first feasible implementation manner in which the MCPTT server of the temporary group sends the call message to the first UE includes S405.

S405. The MCPTT server of the temporary group sends a first paging message to the first UE.

In this embodiment, the first paging message is used to page the first UE to join the multi-group call, so that the first UE joins the multi-group call according to the first paging message.

In a first optional implementation solution, if the information about the temporary group includes information about the first MCPTT user, the MCPTT server of the temporary group sends the first paging message to the first UE according to the information about the first MCPTT user. The information about the first MCPTT user may include an identifier of the first MCPTT user and location information of the first MCPTT user.

In a second optional implementation solution, if the information about the temporary group includes information about the first MCPTT user, when the information about the first MCPTT user includes an identifier of the first MCPTT user but does not include location information of the first MCPTT user, the MCPTT server of the temporary group obtains, according to the identifier of the first MCPTT user, the location information of the first MCPTT user from an MCPTT server of the first MCPTT user or a database that stores information about an MCPTT user, and then sends the first paging message to the first UE.

Optionally, the first paging message includes the identifier of the temporary group.

Optionally, the first paging message further includes the identifier of the first MCPTT user.

A second feasible implementation manner in which the MCPTT server of the temporary group sends the call message to the first UE includes S406 and S407.

S406. The MCPTT server of the temporary group sends a second paging message to an MCPTT server of the first MCPTT user.

In this embodiment, the second paging message is used to page the first UE to join the multi-group call, so that the MCPTT server of the first MCPTT user sends a third paging message to the first UE, where the third paging message is used to page the first UE to join the multi-group call, so that the first UE joins the multi-group call according to the third paging message.

In an optional implementation solution, if the information about the temporary group includes information about the first MCPTT user, when the information about the first MCPTT user includes an identifier of the first MCPTT user but does not include location information of the first MCPTT user, and the MCPTT server of the temporary group is not the MCPTT server of the first MCPTT user, the MCPTT server of the temporary group sends the second paging message to the MCPTT server of the first MCPTT user according to the identifier of the first MCPTT user and the multi-group call setup message.

Optionally, the second paging message includes the identifier of the temporary group.

Optionally, the second paging message further includes the identifier of the first MCPTT user.

S407. The MCPTT server of the first MCPTT user sends a third paging message to the first UE.

In this embodiment, the MCPTT server of the first MCPTT user receives the second paging message sent by the MCPTT server of the temporary group, and then sends the third paging message to the first UE, where the third paging message is used to page the first UE to join the multi-group call.

Optionally, the third paging message includes the identifier of the temporary group.

Optionally, the third paging message further includes the identifier of the first MCPTT user.

It should be noted that the second paging message and the third paging message may be a same message, that is, the MCPTT server of the first MCPTT user forwards a message that is sent by the MCPTT server of the temporary group; or the second paging message and the third paging message may be different messages, that is, the MCPTT server of the first MCPTT user may parse a message that is sent by the MCPTT server of the temporary group, and then send a message obtained after parsing processing to the first UE.

A third feasible implementation manner in which the MCPTT server of the temporary group sends the call message to the first UE includes S408 and S409.

S408. The MCPTT server of the temporary group sends a fourth paging message to an MCPTT server of an MCPTT group to which the first MCPTT user belongs.

In this embodiment, the fourth paging message is used to page the first UE to join the multi-group call, so that the MCPTT server of the MCPTT group to which the first MCPTT user belongs sends a fifth paging message to the first UE, and the first UE joins the multi-group call according to the fifth paging message.

In an optional implementation solution, when the information about the temporary group does not include information about the first MCPTT user, the MCPTT server of the temporary group sends, according to an identifier of the MCPTT group to which the first MCPTT user belongs, the fourth paging message to the MCPTT server of the MCPTT group to which the first MCPTT user belongs.

Optionally, the fourth paging message includes the identifiers of the N MCPTT groups.

Optionally, the fourth paging message further includes an identifier of the first MCPTT user.

S409. The MCPTT server of the MCPTT group to which the first MCPTT user belongs sends a fifth paging message to the first UE.

In this embodiment, after receiving the fourth paging message, the MCPTT server of the MCPTT group to which the first MCPTT user belongs may send the fifth paging message to the first UE. The MCPTT server of the MCPTT group to which the first MCPTT user belongs may directly send the fifth paging message to the first UE without using another network element device; or the MCPTT server of the MCPTT group to which the first MCPTT user belongs may send the fifth paging message to the first UE by using another network element device (for example, an MCPTT server of the first MCPTT user).

Optionally, the fifth paging message that is sent to the first UE by the MCPTT server of the MCPTT group to which the first MCPTT user belongs may carry the identifier of the first MCPTT user.

It should be noted that the fourth paging message and the fifth paging message may be a same message, that is, an MCPTT server between the MCPTT server of the temporary group and the first UE only forwards a message that is sent by the MCPTT server of the temporary group; or the fourth paging message and the fifth paging message may be different messages, that is, an MCPTT server between the MCPTT server of the temporary group and the first UE may parse a message that is sent by the MCPTT server of the temporary group, and then send a message obtained after parsing processing.

S410. The first UE joins the multi-group call.

In this embodiment, the first UE joins the multi-group call according to the received first paging message, or the received third paging message, or the received fifth paging message.

Optionally, the first UE may further send a paging response message to an MCPTT server that sends a paging message (for example, the first paging message, the second paging message, or the fifth paging message) to the first UE. The paging response message is used to indicate that the first UE agrees to join the multi-group call.

Optionally, if the first UE does not join the multi-group call, the first UE may also send a paging response message to an MCPTT server that sends a paging message (for example, the first paging message, the second paging message, or the fifth paging message) to the first UE. The paging response message is used to indicate that the first UE refuses to join the multi-group call.

If the MCPTT server that receives the paging response message of the first UE is not the MCPTT server of the temporary group, the MCPTT server sends a paging acknowledgement message to the MCPTT server of the temporary group according to all received paging response messages. The paging acknowledgement message is used to indicate a multi-group call setup result, for example, completion of setup or a failure of setup, and optionally, further indicate UE that is used by an MCPTT user and that agrees to join the multi-group call, and an MCPTT user who refuses to join the multi-group call.

It should be noted that the MCPTT server of the temporary group may send the call message to the first UE with reference to at least one of the foregoing first, second, or third feasible implementation manner, so that the first UE joins the multi-group call.

A fourth feasible implementation manner in which the MCPTT server of the temporary group sends the call message to the first UE includes S411.

S411. The MCPTT server of the temporary group sends a first notification message to the first UE.

In this embodiment, the first notification message includes a session identifier of the multi-group call, and the first notification message is used to instruct the first UE to join the multi-group call according to the session identifier, so that the first UE joins the multi-group call according to the session identifier.

In an optional implementation solution, if the information about the temporary group includes information about the first MCPTT user, the MCPTT server of the temporary group sends the first notification message to the first UE according to the information about the first MCPTT user. The information about the first MCPTT user may include an identifier of the first MCPTT user and location information of the first MCPTT user.

In another optional implementation solution, if the information about the temporary group includes information about the first MCPTT user, when the information about the first MCPTT user includes an identifier of the first MCPTT user but does not include location information of the first MCPTT user, the MCPTT server of the temporary group obtains, according to the identifier of the first MCPTT user, the location information of the first MCPTT user from an MCPTT server of the first MCPTT user or a database that stores information about an MCPTT user, and then sends the first notification message to the first UE.

Optionally, the first notification message includes the identifier of the temporary group.

Optionally, the first notification message includes the identifier of the first MCPTT user.

A fifth feasible implementation manner in which the MCPTT server of the temporary group sends the call message to the first UE includes S412 and S413.

S412. The MCPTT server of the temporary group sends a second notification message to an MCPTT server of the first MCPTT user.

In this embodiment, the second notification message includes a session identifier of the multi-group call, and the second notification message is used to instruct the first UE to join the multi-group call according to the session identifier, so that the MCPTT server of the first MCPTT user sends a third notification message to the first UE, where the third notification message includes the session identifier of the multi-group call, and the third notification message is used to instruct the first UE to join the multi-group call according to the session identifier, so that the first UE joins the multi-group call according to the session identifier in the third notification message.

In an optional implementation solution, if the information about the temporary group includes information about the first MCPTT user, when the information about the first MCPTT user includes an identifier of the first MCPTT user but does not include location information of the first MCPTT user, and the MCPTT server of the temporary group is not the MCPTT server of the first MCPTT user, the MCPTT server of the temporary group sends the second notification message to the MCPTT server of the first MCPTT user according to the identifier of the first MCPTT user.

Optionally, the second notification message includes the identifier of the temporary group.

Optionally, the second notification message further includes the identifier of the first MCPTT user.

S413. The MCPTT server of the first MCPTT user sends a third notification message to the first UE.

In this embodiment, the MCPTT server of the first MCPTT user receives the second notification message sent by the MCPTT server of the temporary group, and then sends the third notification message to the first UE, where the third notification message includes the session identifier of the multi-group call, and the third notification message is used to instruct the first UE to join the multi-group call according to the session identifier.

Optionally, the third notification message includes the identifier of the temporary group. Optionally, the third notification message further includes the identifier of the first MCPTT user.

It should be noted that the second notification message and the third notification message may be a same message, that is, the MCPTT server of the first MCPTT user forwards a message that is sent by the MCPTT server of the temporary group; or the second notification message and the third notification message may be different messages, that is, the MCPTT server of the first MCPTT user may parse a message that is sent by the MCPTT server of the temporary group, and then send a message obtained after parsing processing to the first UE.

A sixth feasible implementation manner in which the MCPTT server of the temporary group sends the call message to the first UE includes S414 and S415.

S414. The MCPTT server of the temporary group sends a fourth notification message to an MCPTT server of an MCPTT group to which the first MCPTT user belongs.

In this embodiment, the fourth notification message includes a session identifier of the multi-group call, and the fourth notification message is used to instruct the first UE to join the multi-group call according to the session identifier, so that the MCPTT server of the MCPTT group to which the first MCPTT user belongs sends a fifth notification message to the first UE, and the first UE joins the multi-group call according to the session identifier in the fifth notification message.

In an optional implementation solution, when the information about the temporary group does not include information about the first MCPTT user, the MCPTT server of the temporary group sends, according to an identifier of the MCPTT group to which the first MCPTT user belongs, the fourth notification message to the MCPTT server of the MCPTT group to which the first MCPTT user belongs.

Optionally, before sending the foregoing first notification message, the foregoing second notification message, or the foregoing fourth notification message, the MCPTT server of the temporary group may further obtain the session identifier of the multi-group call.

S415. The MCPTT server of the MCPTT group to which the first MCPTT user belongs sends a fifth notification message to the first UE.

In this embodiment, after receiving the fourth notification message, the MCPTT server of the MCPTT group to which the first MCPTT user belongs may send the fifth notification message to the first UE. The MCPTT server of the MCPTT group to which the first MCPTT user belongs may directly send the fifth notification message to the first UE without using another network element device; or the MCPTT server of the MCPTT group to which the first MCPTT user belongs may send the fifth notification message to the first UE by using another network element device (for example, an MCPTT server of the first MCPTT user).

Optionally, the fifth notification message that is sent to the first UE by the MCPTT server of the MCPTT group to which the first MCPTT user belongs may carry an identifier of the first MCPTT user.

It should be noted that the fourth notification message and the fifth notification message may be a same message, that is, an MCPTT server between the MCPTT server of the temporary group and the first UE only forwards a message that is sent by the MCPTT server of the temporary group; or the fourth notification message and the fifth notification message may be different messages, that is, an MCPTT server between the MCPTT server of the temporary group and the first UE may parse a message that is sent by the MCPTT server of the temporary group, and then send a message obtained after parsing processing.

S416. The first UE joins the multi-group call according to a session identifier.

In this embodiment, when the first UE determines to join the multi-group call, the first UE joins the multi-group call according to the session identifier in the received notification message (the first notification message, or the third notification message, or the fifth notification message). If the first UE determines not to join the multi-group call, the first UE ignores the notification message and does not join the multi-group call.

It should be noted that after receiving the foregoing notification message (the first notification message, or the third notification message, or the fifth notification message), the first UE may immediately join the multi-group call according to the session identifier; or when receiving the foregoing notification message (the first notification message, or the third notification message, or the fifth notification message), the first UE may not immediately join the multi-group call. Due to a session collision or for another reason, the first UE may join the multi-group call according to the session identifier after a delay of a period of time.

According to the multi-group call setup method provided in this embodiment, second UE sends a multi-group call setup message to an MCPTT server of a temporary group, where the multi-group call setup message is used by a second MCPTT user to request the MCPTT server of the temporary group to set up a multi-group call involving N MCPTT groups; and then, the MCPTT server of the temporary group obtains information about the temporary group according to an identifier of the temporary group, and then adds first UE to the multi-group call (where an associated user of the first UE is any MCPTT user in the N MCPTT groups except the second MCPTT user). In this way, the multi-group call can be performed among the N MCPTT groups.

Figure 5:
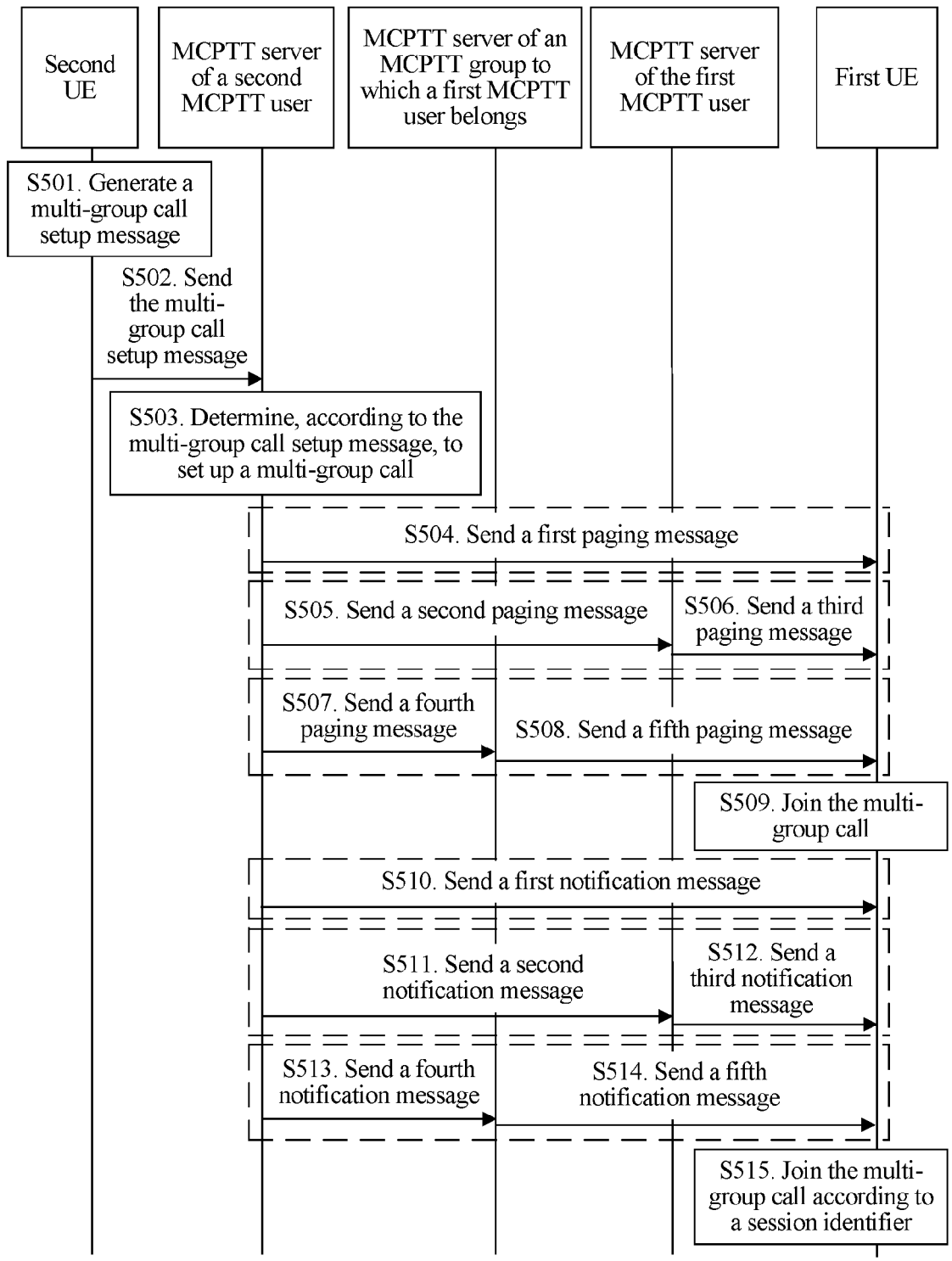
FIG. 5 is a flowchart of a fifth embodiment of a multi-group call setup method according to the some embodiments.

FIG. 5 is a flowchart of a fifth embodiment of a multi-group call setup method according to the present invention. As shown in FIG. 5, a multi-group call setup message in this embodiment includes identifiers of N MCPTT groups, and a first MCPTT server is an MCPTT server of a second MCPTT user. The method in this embodiment may include the following steps:

S501. Second UE generates a multi-group call setup message.

In this embodiment, for a specific implementation process of S501, refer to related descriptions in the fourth method embodiment of the present invention. Details are not described herein.

S502. The second UE sends the multi-group call setup message to an MCPTT server of the second MCPTT user.

S503. The MCPTT server of the second MCPTT user determines, according to the multi-group call setup message, to set up a multi-group call.

In this embodiment, the multi-group call setup message includes identifiers of N MCPTT groups. Optionally, the MCPTT server of the second MCPTT user may obtain information about an MCPTT user in at least one of the N MCPTT groups according to the identifiers of the N MCPTT groups.

After the MCPTT server of the second MCPTT user receives the multi-group call setup message, the MCPTT server of the second MCPTT user may send a call message to first UE, to add the first UE to the multi-group call, where a first MCPTT user is any user in the N MCPTT groups except the second MCPTT user.

A first feasible implementation manner in which the MCPTT server of the second MCPTT user sends the call message to the first UE includes S504.

S504. The MCPTT server of the second MCPTT user sends a first paging message to the first UE.

In this embodiment, the first paging message is used to page the first UE to join the multi-group call, so that the first UE joins the multi-group call according to the first paging message.

In a first optional implementation solution, if the MCPTT server of the second MCPTT user may obtain information about the first MCPTT user, the MCPTT server of the second MCPTT user sends the first paging message to the first UE according to the information about the first MCPTT user. The information about the first MCPTT user may include an identifier of the first MCPTT user and location information of the first MCPTT user.

In a second optional implementation solution, if the MCPTT server of the second MCPTT user may obtain information about the first MCPTT user, when the information about the first MCPTT user includes an identifier of the first MCPTT user but does not include location information of the first MCPTT user, the MCPTT server of the second MCPTT user obtains, according to the identifier of the first MCPTT user, the location information of the first MCPTT user from an MCPTT server of the first MCPTT user or a database that stores information about an MCPTT user, and then sends the first paging message to the first UE.

Optionally, the first paging message includes the identifiers of the N MCPTT groups.

Optionally, the first paging message further includes the identifier of the first MCPTT user.

A second feasible implementation manner in which the MCPTT server of the second MCPTT user sends the call message to the first UE includes S505 and S506.

S505. The MCPTT server of the second MCPTT user sends a second paging message to an MCPTT server of the first MCPTT user.

In this embodiment, the second paging message is used to page the first UE to join the multi-group call, so that the MCPTT server of the first MCPTT user sends a third paging message to the first UE, where the third paging message is used to page the first UE to join the multi-group call, so that the first UE joins the multi-group call according to the third paging message.

In an optional implementation solution, if the MCPTT server of the second MCPTT user may obtain information about the first MCPTT user, when the information about the first MCPTT user includes an identifier of the first MCPTT user but does not include location information of the first MCPTT user, and the MCPTT server of the second MCPTT user is not the MCPTT server of the first MCPTT user, the MCPTT server of the second MCPTT user sends the second paging message to the MCPTT server of the first MCPTT user according to the identifier of the first MCPTT user.

Optionally, the second paging message includes the identifiers of the N MCPTT groups.

Optionally, the second paging message further includes the identifier of the first MCPTT user.

S506. The MCPTT server of the first MCPTT user sends a third paging message to the first UE.

In this embodiment, the MCPTT server of the first MCPTT user receives the second paging message sent by the MCPTT server of the second MCPTT user, and then sends the third paging message to the first UE, where the third paging message is used to page the first UE to join the multi-group call.

Optionally, the third paging message includes the identifiers of the N MCPTT groups.

Optionally, the third paging message further includes the identifier of the first MCPTT user.

It should be noted that the second paging message and the third paging message may be a same message, that is, the MCPTT server of the first MCPTT user forwards a message that is sent by the MCPTT server of the second MCPTT user; or the second paging message and the third paging message may be different messages, that is, the MCPTT server of the first MCPTT user may parse a message that is sent by the MCPTT server of the second MCPTT user, and then send a message obtained after parsing processing to the first UE.

A third feasible implementation manner in which the MCPTT server of the second MCPTT user sends the call message to the first UE includes S507 and S508.

S507. The MCPTT server of the second MCPTT user sends a fourth paging message to an MCPTT server of an MCPTT group to which the first MCPTT user belongs.

In this embodiment, the fourth paging message is used to page the first UE to join the multi-group call, so that the MCPTT server of the MCPTT group to which the first MCPTT user belongs sends a fifth paging message to the first UE, and the first UE joins the multi-group call according to the fifth paging message.

In an optional implementation solution, when the MCPTT server of the second MCPTT user does not obtain information about the first MCPTT user, the MCPTT server of the second MCPTT user sends, according to an identifier of the MCPTT group to which the first MCPTT user belongs, the fourth paging message to the MCPTT server of the MCPTT group to which the first MCPTT user belongs.

Optionally, the fourth paging message includes the identifiers of the N MCPTT groups.

Optionally, the fourth paging message further includes an identifier of the first MCPTT user.

S508. The MCPTT server of the MCPTT group to which the first MCPTT user belongs sends a fifth paging message to the first UE.

In this embodiment, after receiving the fourth paging message, the MCPTT server of the MCPTT group to which the first MCPTT user belongs may send the fifth paging message to the first UE. The MCPTT server of the MCPTT group to which the first MCPTT user belongs may directly send the fifth paging message to the first UE without using another network element device; or the MCPTT server of the MCPTT group to which the first MCPTT user belongs may send the fifth paging message to the first UE by using another network element device (for example, an MCPTT server of the first MCPTT user).

Optionally, the fifth paging message that is sent to the first UE by the MCPTT server of the MCPTT group to which the first MCPTT user belongs may carry the identifier of the first MCPTT user.

It should be noted that the fourth paging message and the fifth paging message may be a same message, that is, an MCPTT server between the MCPTT server of the second MCPTT user and the first UE only forwards a message that is sent by the MCPTT server of the second MCPTT user; or the fourth paging message and the fifth paging message may be different messages, that is, an MCPTT server between the MCPTT server of the second MCPTT user and the first UE may parse a message that is sent by the MCPTT server of the second MCPTT user, and then send a message obtained after parsing processing.

S509. The first UE joins the multi-group call.

In this embodiment, the first UE joins the multi-group call according to the received first paging message, or the received third paging message, or the received fifth paging message.

Optionally, the first UE may further send a paging response message to an MCPTT server that sends a paging message (for example, the first paging message, the second paging message, or the fifth paging message) to the first UE. The paging response message is used to indicate that the first UE agrees to join the multi-group call.

Optionally, if the first UE does not join the multi-group call, the first UE may also send a paging response message to an MCPTT server that sends a paging message (for example, the first paging message, the second paging message, or the fifth paging message) to the first UE. The paging response message is used to indicate that the first UE refuses to join the multi-group call.

If the MCPTT server that receives the paging response message of the first UE is not the MCPTT server of the second MCPTT user, the MCPTT server sends a paging acknowledgement message to the MCPTT server of the second MCPTT user according to all received paging response messages. The paging acknowledgement message is used to indicate UE that is used by an MCPTT user and that agrees to join the multi-group call, and an MCPTT user who refuses to join the multi-group call.

It should be noted that the MCPTT server of the second MCPTT user may add, with reference to at least one of the foregoing first, second, or third feasible implementation manner, UE used by an MCPTT user in the N MCPTT groups to the multi-group call.

A fourth feasible implementation manner in which the MCPTT server of the second MCPTT user sends the call message to the first UE includes S510.

S510. The MCPTT server of the second MCPTT user sends a first notification message to the first UE.

In this embodiment, the first notification message includes a session identifier of the multi-group call, and the first notification message is used to instruct the first UE to join the multi-group call according to the session identifier, so that the first UE joins the multi-group call according to the session identifier.

In an optional implementation solution, if the MCPTT server of the second MCPTT user may obtain information about the first MCPTT user, the MCPTT server of the second MCPTT user sends the first notification message to the first UE according to the information about the first MCPTT user. The information about the first MCPTT user may include an identifier of the first MCPTT user and location information of the first MCPTT user.

In another optional implementation solution, if the MCPTT server of the second MCPTT user may obtain information about the first MCPTT user, when the information about the first MCPTT user includes an identifier of the first MCPTT user but does not include location information of the first MCPTT user, the MCPTT server of the second MCPTT user obtains, according to the identifier of the first MCPTT user, the location information of the first MCPTT user from an MCPTT server of the first MCPTT user or a database that stores information about an MCPTT user, and then sends the first notification message to the first UE.

Optionally, the first notification message includes the identifiers of the N MCPTT groups.

Optionally, the first notification message includes the identifier of the first MCPTT user.

A fifth feasible implementation manner in which the MCPTT server of the second MCPTT user sends the call message to the first UE includes S511 and S512.

S511. The MCPTT server of the second MCPTT user sends a second notification message to an MCPTT server of the first MCPTT user.

In this embodiment, the second notification message includes a session identifier of the multi-group call, and the second notification message is used to instruct the first UE to join the multi-group call according to the session identifier, so that the MCPTT server of the first MCPTT user sends a third notification message to the first UE, where the third notification message includes the session identifier of the multi-group call, and the third notification message is used to instruct the first UE to join the multi-group call according to the session identifier, so that the first UE joins the multi-group call according to the session identifier in the third notification message.

In an optional implementation solution, if the MCPTT server of the second MCPTT user may obtain information about the first MCPTT user, when the information about the first MCPTT user includes an identifier of the first MCPTT user but does not include location information of the first MCPTT user, the MCPTT server of the second MCPTT user sends the second notification message to the MCPTT server of the first MCPTT user according to the identifier of the first MCPTT user.

Optionally, the second notification message includes the identifiers of the N MCPTT groups.

Optionally, the second notification message further includes the identifier of the first MCPTT user.

S512. The MCPTT server of the first MCPTT user sends a third notification message to the first UE.

In this embodiment, the MCPTT server of the first MCPTT user receives the second notification message sent by the MCPTT server of the second MCPTT user, and then sends the third notification message to the first UE, where the third notification message includes the session identifier of the multi-group call, and the third notification message is used to instruct the first UE to join the multi-group call according to the session identifier.

Optionally, the third notification message includes the identifiers of the N MCPTT groups.

Optionally, the third notification message further includes the identifier of the first MCPTT user.

It should be noted that the second notification message and the third notification paging message may be a same message, that is, the MCPTT server of the first MCPTT user forwards a message that is sent by the MCPTT server of the second MCPTT user; or the second notification message and the third notification message may be different messages, that is, the MCPTT server of the first MCPTT user may parse a message that is sent by the MCPTT server of the second MCPTT user, and then send a message obtained after parsing processing to the first UE.

A sixth feasible implementation manner in which the MCPTT server of the second MCPTT user sends the call message to the first UE includes S513 and S514.

S513. The MCPTT server of the second MCPTT user sends a fourth notification message to an MCPTT server of an MCPTT group to which the first MCPTT user belongs.

In this embodiment, the fourth notification message includes a session identifier of the multi-group call, and the fourth notification message is used to instruct the first UE to join the multi-group call according to the session identifier, so that the MCPTT server of the MCPTT group to which the first MCPTT user belongs sends a fifth notification message to the first UE, and the first UE joins the multi-group call according to the session identifier in the fifth notification message.

In an optional implementation solution, when the MCPTT server of the second MCPTT user does not obtain information about the first MCPTT user, the MCPTT server of the second MCPTT user sends, according to an identifier of the MCPTT group to which the first MCPTT user belongs, the fourth notification message to the MCPTT server of the MCPTT group to which the first MCPTT user belongs.

Optionally, before sending the foregoing first notification message, the foregoing second notification message, or the foregoing fourth notification message, the MCPTT server of the second MCPTT user may further obtain the session identifier of the multi-group call.

S514. The MCPTT server of the MCPTT group to which the first MCPTT user belongs sends a fifth notification message to the first UE.

In this embodiment, after receiving the fourth notification message, the MCPTT server of the MCPTT group to which the first MCPTT user belongs may send the fifth notification message to the first UE. The MCPTT server of the MCPTT group to which the first MCPTT user belongs may directly send the fifth notification message to the first UE without using another network element device; or the MCPTT server of the MCPTT group to which the first MCPTT user belongs may send the fifth notification message to the first UE by using another network element device (for example, an MCPTT server of the first MCPTT user).

Optionally, the fifth notification message that is sent to the first UE by the MCPTT server of the MCPTT group to which the first MCPTT user belongs may carry an identifier of the first MCPTT user.

It should be noted that the fourth notification message and the fifth notification message may be a same message, that is, an MCPTT server between the MCPTT server of the second MCPTT user and the first UE only forwards a message that is sent by the MCPTT server of the second MCPTT user; or the fourth notification message and the fifth notification message may be different messages, that is, an MCPTT server between the MCPTT server of the second MCPTT user and the first UE may parse a message that is sent by the MCPTT server of the second MCPTT user, and then send a message obtained after parsing processing.

S515. The first UE joins the multi-group call according to a session identifier.

In this embodiment, when the first UE determines to join the multi-group call, the first UE joins the multi-group call according to the session identifier in the received notification message (the first notification message, or the third notification message, or the fifth notification message).

If the first UE determines not to join the multi-group call, the first UE ignores the notification message and does not join the multi-group call.

It should be noted that after receiving the foregoing notification message (the first notification message, or the third notification message, or the fifth notification message), the first UE may immediately join the multi-group call according to the session identifier; or when receiving the foregoing notification message (the first notification message, or the third notification message, or the fifth notification message), the first UE may not immediately join the multi-group call. Due to a session collision or for another reason, the first UE may join the multi-group call according to the session identifier after a delay of a period of time.

According to the multi-group call setup method provided in this embodiment, second UE sends a multi-group call setup message to an MCPTT server of a second MCPTT user, and the MCPTT server of the second MCPTT user adds first UE to a multi-group call (where an associated user of the first UE is any MCPTT user in N MCPTT groups except the second MCPTT user). In this way, the multi-group call can be performed among the N MCPTT groups.

Figure 6:
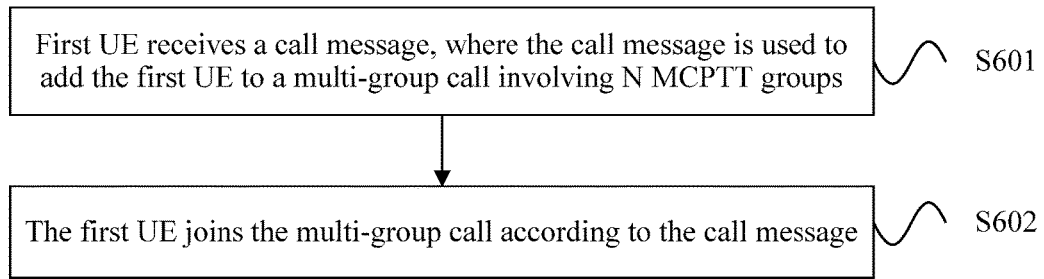
FIG. 6 is a flowchart of a sixth embodiment of a multi-group call setup method according to the some embodiments.

FIG. 6 is a flowchart of a sixth embodiment of a multi-group call setup method according to the present invention. As shown in FIG. 6, the method in this embodiment may include the following steps:

S601. First UE receives a call message, where the call message is used to add the first UE to a multi-group call involving N MCPTT groups.

In this embodiment, N is an integer greater than or equal to 2. Each MCPTT group includes at least one MCPTT user. An associated user of the first UE is a first MCPTT user, that is, UE used by the first MCPTT user is the first UE. The first MCPTT user is any MCPTT user in the N MCPTT groups, and an MCPTT group to which the first MCPTT user belongs is at least one of the N MCPTT groups.

S602. The first UE joins the multi-group call according to the call message.

Optionally, the receiving, by first UE, a call message includes receiving, by the first UE, a notification message, where the notification message includes a session identifier of the multi-group call involving the N MCPTT groups, and the notification message is used to instruct the first UE to join the multi-group call according to the session identifier.

The joining, by the first UE, the multi-group call according to the call message includes joining, by the first UE, the multi-group call according to the session identifier.

Optionally, the multi-group call involving the N MCPTT groups is initiated by a second MCPTT user, and the first MCPTT user who uses the first UE is any MCPTT user in the N MCPTT groups except the second MCPTT user.

Optionally, the receiving, by first UE, a call message includes receiving, by the first UE, the call message that is sent by an MCPTT server of an MCPTT group to which the first MCPTT user belongs; or receiving, by the first UE, the call message that is sent by an MCPTT server of the first MCPTT user; or receiving, by the first UE, the call message that is sent by an MCPTT server of a temporary group that includes the N MCPTT groups.

Optionally, the call message further includes an identifier of the temporary group that includes the N MCPTT groups.

Optionally, the receiving, by first UE, a call message includes receiving, by the first UE, the call message that is sent by an MCPTT server of an MCPTT group to which the first MCPTT user belongs; or receiving, by the first UE, the call message that is sent by an MCPTT server of the first MCPTT user; or receiving, by the first UE, the call message that is sent by an MCPTT server of the second MCPTT user.

Optionally, the call message further includes identifiers of the N MCPTT groups.

Optionally, after performing S601, the first UE performs, instead of S602, when the first UE does not need to join the multi-group call, ignoring, by the first UE, the call message.

For a specific implementation process of this embodiment, refer to related descriptions in the foregoing method embodiments of the present invention. Details are not described herein.

According to the multi-group call setup method provided in this embodiment, first UE receives a call message, where the call message is used to add the first UE to a multi-group call involving N MCPTT groups; and then joins the multi-group call according to the call message. In this way, the multi-group call can be performed among the N MCPTT groups.

It should be noted that the foregoing described steps performed by the UE are triggered by the UE according to a user operation for performing, and the UE physically performs the foregoing steps.

It should be noted that, if the foregoing MCPTT servers that perform interaction belong to different MCPTT systems, interaction between the MCPTT servers may further need to be performed by using an intermediate network element entity, for example, an interworking gateway (interworking Gateway).

Figure 7:
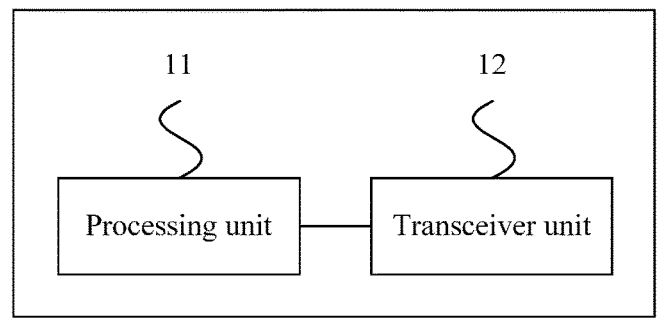
FIG. 7 is a schematic structural diagram of a first embodiment of an MCPTT server according to the some embodiments.

FIG. 7 is a schematic structural diagram of a first embodiment of an MCPTT server according to the present invention. As shown in FIG. 7, the MCPTT server in this embodiment serves as a first MCPTT server and may include a processing unit 11 and a transceiver unit 12.

The processing unit 11 is configured to determine to set up a multi-group call involving N MCPTT groups, where N is an integer greater than or equal to 2.

The transceiver unit 12 is configured to send a call message to first UE, where the call message is used to add the first UE to the multi-group call.

A first MCPTT user is an associated user of the first UE, and the first MCPTT user is any MCPTT user in the N MCPTT groups.

Optionally, before the processing unit 11 determines to set up the multi-group call involving the N MCPTT groups, the transceiver unit 12 is further configured to receive a multi-group call setup message sent by second UE, where the multi-group call setup message is used by a second MCPTT user to request the first MCPTT server to set up the multi-group call involving the N MCPTT groups.

The second MCPTT user is an associated user of the second UE, and an MCPTT group to which the second MCPTT user belongs is at least one of the N MCPTT groups.

When determining to set up the multi-group call involving the N MCPTT groups, the processing unit 11 is configured to determine, according to the multi-group call setup message, to set up the multi-group call.

The first MCPTT user is any MCPTT user in the N MCPTT groups except the second MCPTT user.

In a feasible implementation manner, the multi-group call setup message includes an identifier of a temporary group that includes the N MCPTT groups, and the first MCPTT server is an MCPTT server of the temporary group.

Optionally, when receiving the multi-group call setup message sent by the second UE, the transceiver unit 12 is configured to receive the multi-group call setup message that is sent by the second UE and that is forwarded by an MCPTT server of the second MCPTT user.

Optionally, before the transceiver unit 12 sends the call message to the first UE, the processing unit 11 is further configured to obtain information about the temporary group according to the identifier of the temporary group.

The information about the temporary group includes the identifier of the temporary group and identifiers of the N MCPTT groups.

Optionally, the information about the temporary group further includes information about an MCPTT user in at least one of the N MCPTT groups.

In another feasible implementation manner, the multi-group call setup message includes identifiers of the N MCPTT groups.

The first MCPTT server is an MCPTT server of the second MCPTT user.

Optionally, before the transceiver unit 12 sends the call message to the first UE, the processing unit 11 is further configured to obtain information about an MCPTT user in at least one of the N MCPTT groups according to the identifiers of the N MCPTT groups.

Optionally, when the transceiver unit 12 sends the call message to the first UE, the following optional implementation solutions may be used.

In a first optional implementation solution, when sending the call message to the first UE, the transceiver unit 12 is configured to send a first paging message to the first UE.

The first paging message is used to page the first UE to join the multi-group call, so that the first UE joins the multi-group call according to the first paging message.

In a second optional implementation solution, when sending the call message to the first UE, the transceiver unit 12 is configured to send a second paging message to an MCPTT server of the first MCPTT user.

The second paging message is used to page the first UE to join the multi-group call, so that the MCPTT server of the first MCPTT user sends a third paging message to the first UE, and the first UE joins the multi-group call according to the third paging message.

In a third optional implementation solution, when sending the call message to the first UE, the transceiver unit 12 is configured to send a fourth paging message to an MCPTT server of an MCPTT group to which the first MCPTT user belongs.

The fourth paging message is used to page the first UE to join the multi-group call, so that the MCPTT server of the MCPTT group to which the first MCPTT user belongs sends a fifth paging message to the first UE or sends a fifth paging message to the first UE by using an MCPTT server of the first MCPTT user, and the first UE joins the multi-group call according to the fifth paging message, where the fifth paging message is used to page the first UE to join the multi-group call.

In a fourth optional implementation solution, when sending the call message to the first UE, the transceiver unit 12 is configured to send a first notification message to the first UE.

The first notification message includes a session identifier of the multi-group call, and the first notification message is used to instruct the first UE to join the multi-group call according to the session identifier, so that the first UE joins the multi-group call according to the session identifier.

In a fifth optional implementation solution, when sending the call message to the first UE, the transceiver unit 12 is configured to send a second notification message to an MCPTT server of the first MCPTT user.

The second notification message includes a session identifier of the multi-group call, and the second notification message is used to instruct the first UE to join the multi-group call according to the session identifier, so that the MCPTT server of the first MCPTT user sends a third notification message to the first UE, where the third notification message includes the session identifier, and the third notification message is used to instruct the first UE to join the multi-group call according to the session identifier, so that the first UE joins the multi-group call according to the session identifier.

In a sixth optional implementation solution, when sending the call message to the first UE, the transceiver unit 12 is configured to send a fourth notification message to an MCPTT server of an MCPTT group to which the first MCPTT user belongs.

The fourth notification message includes a session identifier of the multi-group call, and the fourth notification message is used to instruct the first UE to join the multi-group call according to the session identifier, so that the MCPTT server of the MCPTT group to which the first MCPTT user belongs sends a fifth notification message to the first UE or sends a fifth notification message to the first UE by using an MCPTT server of the first MCPTT user, and the first UE joins the multi-group call according to the session identifier.

The MCPTT server in this embodiment may be configured to execute the technical solutions executed by the first MCPTT server in the foregoing method embodiments of the present invention. Implementation principles thereof are similar, and details are not described herein.

In this embodiment, a processing unit 11 of an MCPTT server determines to set up a multi-group call involving N MCPTT groups, and a transceiver unit 12 of the MCPTT server sends a call message to first UE, so that the first UE joins the multi-group call according to the call message, where a first MCPTT user is an associated user of the first UE, and the first MCPTT user is any MCPTT user in the N MCPTT groups. In this way, the multi-group call can be performed among the N MCPTT groups.

Figure 8:
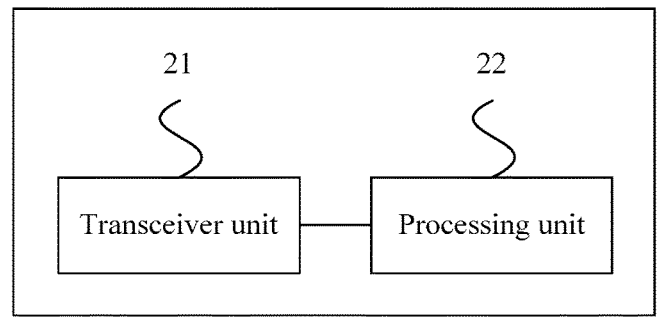
FIG. 8 is a schematic structural diagram of a first embodiment of UE according to the some embodiments.

FIG. 8 is a schematic structural diagram of a first embodiment of UE according to the present invention. As shown in FIG. 8, the UE in this embodiment serves as first UE and may include a transceiver unit 21 and a processing unit 22.

The transceiver unit 21 is configured to receive a call message, where the call message is used to add the first UE to a multi-group call involving N MCPTT groups.

N is an integer greater than or equal to 2, a first MCPTT user is an associated user of the first UE, and the first MCPTT user is any MCPTT user in the N MCPTT groups.

The processing unit 22 is configured to join the multi-group call according to the call message.

Optionally, when receiving the call message, the transceiver unit 21 is configured to receive a notification message, where the notification message includes a session identifier of the multi-group call.

The notification message is used to instruct the first UE to join the multi-group call according to the session identifier.

When joining the multi-group call according to the call message, the processing unit 22 is configured to join the multi-group call according to the session identifier.

Optionally, the multi-group call involving the N MCPTT groups is initiated by a second MCPTT user.

The first MCPTT user is any MCPTT user in the N MCPTT groups except the second MCPTT user.

Optionally, when receiving the call message, the transceiver unit 21 is configured to receive the call message that is sent by an MCPTT server of an MCPTT group to which the first MCPTT user belongs; or receive the call message that is sent by an MCPTT server of the first MCPTT user; or receive the call message that is sent by an MCPTT server of a temporary group that includes the N MCPTT groups.

Optionally, when receiving the call message, the transceiver unit 21 is configured to receive the call message that is sent by an MCPTT server of the second MCPTT user.

The UE in this embodiment may be configured to execute the technical solutions executed by the first UE in the foregoing method embodiments of the present invention. Implementation principles thereof are similar, and details are not described herein.

In this embodiment, a transceiver unit 21 of UE receives a call message, where the call message is used to add the first UE to a multi-group call involving N MCPTT groups; and then, a processing unit 22 of the UE joins the multi-group call according to the call message. In this way, the multi-group call can be performed among the N MCPTT groups.

Figure 9:
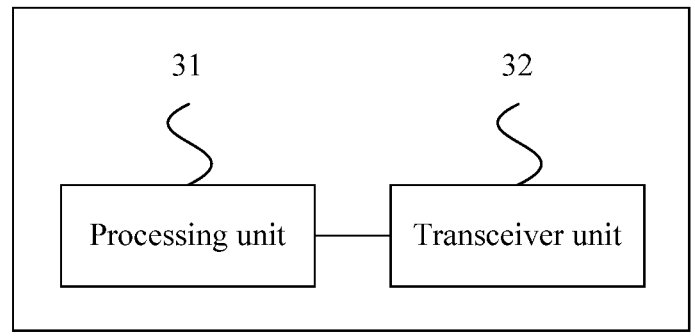
FIG. 9 is a schematic structural diagram of a second embodiment of UE according to the some embodiments.

FIG. 9 is a schematic structural diagram of a second embodiment of UE according to the present invention. As shown in FIG. 9, the UE in this embodiment serves as second UE and may include a processing unit 31 and a transceiver unit 32.

The processing unit 31 is configured to generate a multi-group call setup message, where the multi-group call setup message is used by a second MCPTT user to request a first MCPTT server to set up a multi-group call involving N MCPTT groups.

N is an integer greater than or equal to 2, the second MCPTT user is an associated user of the second UE, and an MCPTT group to which the second MCPTT user belongs is at least one of the N MCPTT groups.

The transceiver unit 32 is configured to send the multi-group call setup message to the first MCPTT server.

In a feasible implementation manner, the multi-group call setup message includes an identifier of a temporary group that includes the N MCPTT groups.

The first MCPTT server is an MCPTT server of the temporary group.

Optionally, when sending the multi-group call setup message to the first MCPTT server, the transceiver unit 32 is configured to send the multi-group call setup message to the first MCPTT server by using an MCPTT server of the second MCPTT user.

Optionally, the processing unit 31 is further configured to create the temporary group before the transceiver unit 32 sends the multi-group call setup message to the first MCPTT server.

In another feasible implementation manner, the multi-group call setup message includes identifiers of the N MCPTT groups.

The first MCPTT server is an MCPTT server of the second MCPTT user.

The UE in this embodiment may be configured to execute the technical solutions executed by the second UE in the foregoing method embodiments of the present invention. Implementation principles thereof are similar, and details are not described herein.

In this embodiment, a processing unit 31 of UE generates a multi-group call setup message, and a transceiver unit 32 of the UE sends the multi-group call setup message to a first MCPTT server, where the multi-group call setup message is used by a second MCPTT user to request the first MCPTT server to set up a multi-group call involving N MCPTT groups, so that the first MCPTT server can send a call message to first UE (where an associated user of the first UE is any MCPTT user in the N MCPTT groups except the second MCPTT user), and the first UE joins the multi-group call. In this way, the multi-group call can be performed among the N MCPTT groups.

Figure 10:
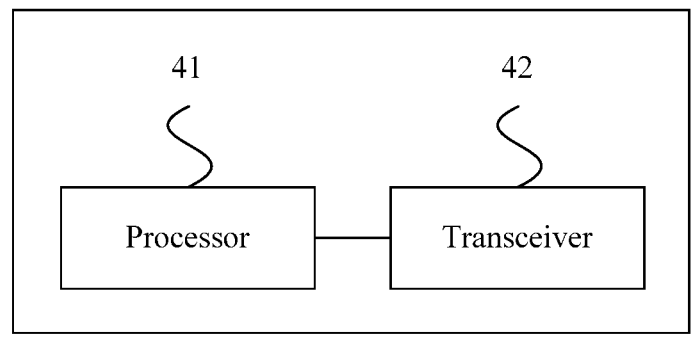
FIG. 10 is a schematic structural diagram of a second embodiment of an MCPTT server according to the some embodiments.

FIG. 10 is a schematic structural diagram of a second embodiment of an MCPTT server according to the present invention. As shown in FIG. 10, the MCPTT server in this embodiment serves as a first MCPTT server and may include a processor 41 and a transceiver 42.

The processor 41 is configured to determine to set up a multi-group call involving N MCPTT groups, where N is an integer greater than or equal to 2.

The transceiver 42 is configured to send a call message to first user equipment UE, where the call message is used to add the first UE to the multi-group call.

A first MCPTT user is an associated user of the first UE, and the first MCPTT user is any MCPTT user in the N MCPTT groups.

Optionally, before the processor 41 determines to set up the multi-group call involving the N MCPTT groups, the transceiver 42 is further configured to receive a multi-group call setup message sent by second UE, where the multi-group call setup message is used by a second MCPTT user to request the first MCPTT server to set up the multi-group call involving the N MCPTT groups.

The second MCPTT user is an associated user of the second UE, and an MCPTT group to which the second MCPTT user belongs is at least one of the N MCPTT groups.

When determining to set up the multi-group call involving the N MCPTT groups, the processor 41 is configured to determine, according to the multi-group call setup message, to set up the multi-group call.

The first MCPTT user is any MCPTT user in the N MCPTT groups except the second MCPTT user.

In a feasible implementation manner, the multi-group call setup message includes an identifier of a temporary group that includes the N MCPTT groups.

The first MCPTT server is an MCPTT server of the temporary group.

Optionally, when receiving the multi-group call setup message sent by the second UE, the transceiver 42 is configured to:

receive the multi-group call setup message that is sent by the second UE and that is forwarded by an MCPTT server of the second MCPTT user.

Optionally, before the transceiver 42 sends the call message to the first UE, the processor 41 is further configured to obtain information about the temporary group according to the identifier of the temporary group.

The information about the temporary group includes the identifier of the temporary group and identifiers of the N MCPTT groups.

Optionally, the information about the temporary group further includes information about an MCPTT user in at least one of the N MCPTT groups.

In another feasible implementation manner, the multi-group call setup message includes identifiers of the N MCPTT groups.

The first MCPTT server is an MCPTT server of the second MCPTT user.

Optionally, before the transceiver 42 sends the call message to the first UE, the processor 41 is further configured to obtain information about an MCPTT user in at least one of the N MCPTT groups according to the identifiers of the N MCPTT groups.

Optionally, when the transceiver 42 sends the call message to the first UE, the following optional implementation solutions may be used.

In a first optional implementation solution, when sending the call message to the first UE, the transceiver 42 is configured to send a first paging message to the first UE.

The first paging message is used to page the first UE to join the multi-group call, so that the first UE joins the multi-group call according to the first paging message.

In a second optional implementation solution, when sending the call message to the first UE, the transceiver 42 is configured to send a second paging message to an MCPTT server of the first MCPTT user.

The second paging message is used to page the first UE to join the multi-group call, so that the MCPTT server of the first MCPTT user sends a third paging message to the first UE, and the first UE joins the multi-group call according to the third paging message.

In a third optional implementation solution, when sending the call message to the first UE, the transceiver 42 is configured to send a fourth paging message to an MCPTT server of an MCPTT group to which the first MCPTT user belongs.

The fourth paging message is used to page the first UE to join the multi-group call, so that the MCPTT server of the MCPTT group to which the first MCPTT user belongs sends a fifth paging message to the first UE or sends a fifth paging message to the first UE by using an MCPTT server of the first MCPTT user, and the first UE joins the multi-group call according to the fifth paging message, where the fifth paging message is used to page the first UE to join the multi-group call.

In a fourth optional implementation solution, when sending the call message to the first UE, the transceiver 42 is configured to send a first notification message to the first UE.

The first notification message includes a session identifier of the multi-group call, and the first notification message is used to instruct the first UE to join the multi-group call according to the session identifier, so that the first UE joins the multi-group call according to the session identifier.

In a fifth optional implementation solution, when sending the call message to the first UE, the transceiver 42 is configured to send a second notification message to an MCPTT server of the first MCPTT user.

The second notification message includes a session identifier of the multi-group call, and the second notification message is used to instruct the first UE to join the multi-group call according to the session identifier, so that the MCPTT server of the first MCPTT user sends a third notification message to the first UE, where the third notification message includes the session identifier, and the third notification message is used to instruct the first UE to join the multi-group call according to the session identifier, so that the first UE joins the multi-group call according to the session identifier.

In a sixth optional implementation solution, when sending the call message to the first UE, the transceiver 42 is configured to send a fourth notification message to an MCPTT server of an MCPTT group to which the first MCPTT user belongs.

The fourth notification message includes a session identifier of the multi-group call, and the fourth notification message is used to instruct the first UE to join the multi-group call according to the session identifier, so that the MCPTT server of the MCPTT group to which the first MCPTT user belongs sends a fifth notification message to the first UE or sends a fifth notification message to the first UE by using an MCPTT server of the first MCPTT user, and the first UE joins the multi-group call according to the session identifier.

The MCPTT server in this embodiment may be configured to execute the technical solutions executed by the first MCPTT server in the foregoing method embodiments of the present invention. Implementation principles thereof are similar, and details are not described herein.

In this embodiment, a processor 41 of an MCPTT server determines to set up a multi-group call involving N MCPTT groups, and a transceiver 42 of the MCPTT server sends a call message to first UE, so that the first UE joins the multi-group call according to the call message, where a first MCPTT user is an associated user of the first UE, and the first MCPTT user is any MCPTT user in the N MCPTT groups. In this way, the multi-group call can be performed among the N MCPTT groups.

Figure 11:
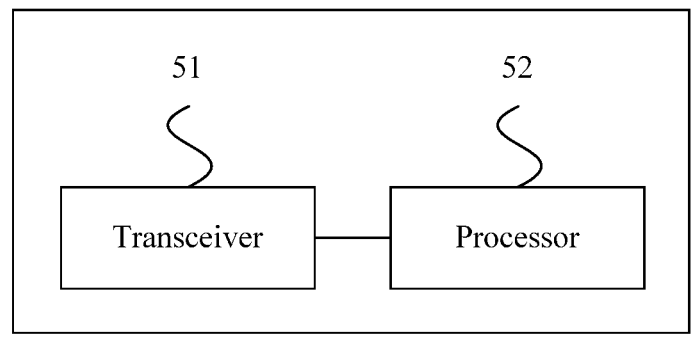
FIG. 11 is a schematic structural diagram of a third embodiment of UE according to the some embodiments.

FIG. 11 is a schematic structural diagram of a third embodiment of UE according to the present invention. As shown in FIG. 11, the UE in this embodiment serves as first UE and may include a transceiver 51 and a processor 52.

The transceiver 51 is configured to receive a call message, where the call message is used to add the first UE to a multi-group call involving N MCPTT groups.

N is an integer greater than or equal to 2, a first MCPTT user is an associated user of the first UE, and the first MCPTT user is any MCPTT user in the N MCPTT groups.

The processor 52 is configured to join the multi-group call according to the call message.

Optionally, when receiving the call message, the transceiver 51 is configured to receive a notification message, where the notification message includes a session identifier of the multi-group call.

The notification message is used to instruct the first UE to join the multi-group call according to the session identifier.

When joining the multi-group call according to the call message, the processor 52 is configured to join the multi-group call according to the session identifier.

Optionally, the multi-group call involving the N MCPTT groups is initiated by a second MCPTT user.

The first MCPTT user is any MCPTT user in the N MCPTT groups except the second MCPTT user.

Optionally, when receiving the call message, the transceiver 51 is configured to receive the call message that is sent by an MCPTT server of an MCPTT group to which the first MCPTT user belongs; or receive the call message that is sent by an MCPTT server of the first MCPTT user; or receive the call message that is sent by an MCPTT server of a temporary group that includes the N MCPTT groups.

Optionally, when receiving the call message, the transceiver 51 is configured to receive the call message that is sent by an MCPTT server of the second MCPTT user.

The UE in this embodiment may be configured to execute the technical solutions executed by the first UE in the foregoing method embodiments of the present invention. Implementation principles thereof are similar, and details are not described herein.

In this embodiment, a transceiver 51 of UE receives a call message, where the call message is used to add the first UE to a multi-group call involving N MCPTT groups; and then, a processor 52 of the UE joins the multi-group call according to the call message. In this way, the multi-group call can be performed among the N MCPTT groups.

Figure 12:
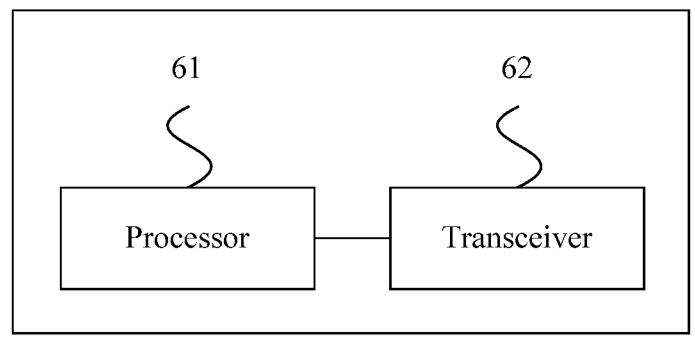
FIG. 12 is a schematic structural diagram of a fourth embodiment of UE according to the some embodiments.

FIG. 12 is a schematic structural diagram of a fourth embodiment of UE according to the present invention. As shown in FIG. 12, the UE in this embodiment serves as second UE and may include a processor 61 and a transceiver 62.

The processor 61 is configured to generate a multi-group call setup message, where the multi-group call setup message is used by a second MCPTT user to request a first MCPTT server to set up a multi-group call involving N MCPTT groups.

N is an integer greater than or equal to 2, the second MCPTT user is an associated user of the second UE, and an MCPTT group to which the second MCPTT user belongs is at least one of the N MCPTT groups.

The transceiver 62 is configured to send the multi-group call setup message to the first MCPTT server.

In a feasible implementation manner, the multi-group call setup message includes an identifier of a temporary group that includes the N MCPTT groups.

The first MCPTT server is an MCPTT server of the temporary group.

Optionally, when sending the multi-group call setup message to the first MCPTT server, the transceiver 62 is configured to send the multi-group call setup message to the first MCPTT server by using an MCPTT server of the second MCPTT user.

Optionally, the processor 61 is further configured to create the temporary group before the transceiver 62 sends the multi-group call setup message to the first MCPTT server.

In another feasible implementation manner, the multi-group call setup message includes identifiers of the N MCPTT groups.

The first MCPTT server is an MCPTT server of the second MCPTT user.

The UE in this embodiment may be configured to execute the technical solutions executed by the second UE in the foregoing method embodiments of the present invention. Implementation principles thereof are similar, and details are not described herein.

In this embodiment, a processor 61 of UE generates a multi-group call setup message, and a transceiver 62 of the UE sends the multi-group call setup message to a first MCPTT server, where the multi-group call setup message is used by a second MCPTT user to request the first MCPTT server to set up a multi-group call involving N MCPTT groups, so that the first MCPTT server can send a call message to first UE (where an associated user of the first UE is any MCPTT user in the N MCPTT groups except the second MCPTT user), and the first UE joins the multi-group call. In this way, the multi-group call can be performed among the N MCPTT groups.

Persons of ordinary skill in the art may understand that all or some of the steps of the foregoing method embodiments may be implemented by a program instructing relevant hardware. The foregoing program may be stored in a computer readable storage medium. When the program runs, the steps of the foregoing method embodiments are performed. The foregoing storage medium includes: any medium that can store program code, such as a read-only memory (ROM for short), a random access memory (RAM for short), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A multi-group call setup method, comprising:
receiving, by a first mission critical push to talk (MCPTT) server of a temporary group comprising N MCPTT groups, a multi-group call setup message sent from a second user equipment (UE), wherein a second MCPTT user is an associated user of the second UE, and the second MCPTT user is a MCPTT user in one of the N MCPTT groups, wherein the multi-group call setup message comprises an identifier of the temporary group;
determining, by the first MCPTT server, to set up a multi-group call involving the N MCPTT groups, wherein N is an integer greater than or equal to 2; and
sending, by the first MCPTT server, a call message to a UE, wherein the call message is used to add the first UE to the multi-group call, wherein a first MCPTT user is an associated user of the first UE, and wherein the first MCPTT user is an MCPTT user in the N MCPTT groups;
wherein the sending the call message to the first UE comprises sending, by the first MCPTT server, a first paging message to a MCPTT server of a MCPTT group to which the first MCPTT user belongs according to an identifier of the MCPTT group to which the first MCPTT user belongs, wherein the first paging message causes the MCPTT server of the MCPTT group to which the first MCPTT user belongs to send a second paging message to the first UE to page the first UE to join the multi-group call, and wherein the first paging message comprises the identifier of the temporary group.

2. The method according to claim 1, wherein the determining, by a first MCPTT server, to set up a multi-group call involving N MCPTT groups comprises:
determining, by the first MCPTT server according to the multi-group call setup message, to set up the multi-group call, wherein the first MCPTT user is any MCPTT user in the N MCPTT groups other than the second MCPTT user.

3. A multi-group call setup method, comprising:
receiving, by a first user equipment (UE), a call message, wherein the call message is used to add the first UE to a multi-group call involving N mission critical push to talk (MCPTT) groups, wherein N is an integer greater than or equal to 2, wherein a first MCPTT user is an associated user of the first UE, and wherein the first MCPTT user is an MCPTT user in the N MCPTT groups; and
joining, by the first UE, the multi-group call according to the call message;
wherein the receiving the call message comprises receiving, by the first UE, a notification message, wherein the notification message comprises a session identifier of the multi-group call, and wherein the notification message instructs the first UE to join the multi-group call according to the session identifier; and
wherein the joining the multi-group call according to the call message comprises joining, by the first UE, the multi-group call according to the session identifier.

4. A mission critical push to talk (MCPTT) server of a temporary group comprising N MCPTT groups, comprising:
a transceiver, configured to receive a multi-group call setup message from a second user equipment (UE), wherein a second MCPTT user is an associated user of the second UE, wherein the second MCPTT user is a MCPTT user in an MCPTT group of the N MCPTT groups, and wherein the multi-group call setup message comprises an identifier of the temporary group;

a processor; and a non-transitory computer-readable storage medium storing a program to be executed by the processor, the program including instructions to:

determine to set up a multi-group call involving the N MCPTT groups, wherein N is an integer greater than or equal to 2; and cause the transceiver to send a call message to a first UE, wherein the call message is used to add the first UE to the multi-group call, wherein a first MCPTT user is an associated user of the first UE, and wherein the first MCPTT user is an MCPTT user in the N MCPTT groups;

wherein program further includes instructions to cause the transceiver to send, in response to sending the call message to the first UE, a first paging message to a MCPTT server of a MCPTT group to which the first MCPTT user belongs according to an identifier of the MCPTT group to which the first MCPTT user belongs, wherein the first paging message causes the MCPTT server of the MCPTT group to which the first MCPTT user belongs to send a second paging message to the first UE to page the first UE to join the multi-group call, and wherein the first paging message comprises the identifier of the temporary group.

5. The MCPTT server according to claim 4, wherein the program further includes instructions to determine, when determining to set up the multi-group call involving the N MCPTT groups, according to the multi-group call setup message, to set up the multi-group call, wherein the first MCPTT user is an MCPTT user in the N MCPTT groups other than the second MCPTT user.

6. User equipment (UE), serving as a first UE, comprising:

a transceiver, configured to receive a call message, wherein the call message is used to add the first UE to a multi-group call involving N mission critical push to talk (MCPTT) groups, N is an integer greater than or equal to 2, a first MCPTT user is an associated user of the first UE, and the first MCPTT user is any MCPTT user in the N MCPTT groups;

a processor; and a non-transitory computer-readable storage medium storing a program to be executed by the processor, the program including instructions to:

join the multi-group call according to the call message;

wherein the transceiver is further configured to receive a notification message when receiving the call message, wherein the notification message comprises a session identifier of the multi-group call, and wherein the notification message instructs the first UE to join the multi-group call according to the session identifier; and wherein the program further includes instructions to join the multi-group call according to the session identifier when joining the multi-group call according to the call message.

7. The UE according to claim 6, wherein the multi-group call involving the N MCPTT groups is initiated by a second MCPTT user, and wherein the first MCPTT user is an MCPTT user in the N MCPTT groups other than the second MCPTT user.

8. The UE according to claim 6, wherein the transceiver is further configured to perform, when receiving the call message, at least one of:

receive the call message that is sent by an MCPTT server of an MCPTT group to which the first MCPTT user belongs; or receive the call message that is sent by an MCPTT server of the first MCPTT user; or receive the call message that is sent by an MCPTT server of a temporary group that comprises the N MCPTT groups.

* * * * *

UNITED STATES PATENT AND TRADEMARK OFFICE
CERTIFICATE OF CORRECTION

PATENT NO. : 10,425,775 B2  
APPLICATION NO. : 15/722642  
DATED : September 24, 2019  
INVENTOR(S) : Yanmei Yang et al.

Page 1 of 1

It is certified that error appears in the above-identified patent and that said Letters Patent is hereby corrected as shown below:

In the Claims

In Column 36, Lines 11-12, Claim 1, delete "and the second MCPTT user is a MCPTT user in one of the N MCPTT groups," and insert --and the second MCPTT user is a MCPTT user in an MCPTT group of the N MCPTT groups,--.

Signed and Sealed this  
Twelfth Day of November, 2019

Andrei Iancu  
*Director of the United States Patent and Trademark Office*